(12) United States Patent
Li et al.

(10) Patent No.: US 11,336,626 B2
(45) Date of Patent: May 17, 2022

(54) ENCRYPTION OF MANAGEMENT FRAMES FOR SECURING LONG TRAINING FIELD SEQUENCE GENERATION AND SCHEME FOR TRANSMITTING SOUNDING SIGNAL INDICATIONS

(71) Applicant: Intel Corporation, Santa Clara, CA (US)

(72) Inventors: Qinghua Li, San Ramon, CA (US); Jonathan Segev, Tel Mond (IL); Benny Abramovsky, Petah Tikva (IL); Danny Alexander, Neve Efraim Monoson (IL); Xiaogang Chen, Portland, OR (US); Chittabrata Ghosh, Fremont, CA (US); Feng Jiang, Santa Clara, CA (US); Ido Ouzieli, Tel Aviv (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 16/177,703

(22) Filed: Nov. 1, 2018

(65) Prior Publication Data
US 2019/0132294 A1 May 2, 2019

Related U.S. Application Data

(60) Provisional application No. 62/580,307, filed on Nov. 1, 2017, provisional application No. 62/592,273, filed on Nov. 29, 2017.

(51) Int. Cl.
*H04L 29/06* (2006.01)
*H04L 9/32* (2006.01)
(Continued)

(52) U.S. Cl.
CPC ........ *H04L 63/0428* (2013.01); *G01S 13/762* (2013.01); *G01S 13/765* (2013.01);
(Continued)

(58) Field of Classification Search
CPC . H04L 63/0428; H04L 9/3226; G01S 13/762; G01S 13/765; G01S 13/825; H04W 12/02; H04W 12/06; H04W 12/10
See application file for complete search history.

(56) References Cited

U.S. PATENT DOCUMENTS

| 10,715,995 | B2* | 7/2020 | Segev | ................... H04L 5/0023 |
| 2005/0207581 | A1* | 9/2005 | Qi | ....................... H04W 12/037 380/270 |

(Continued)

*Primary Examiner* — Shanto Abedin
(74) *Attorney, Agent, or Firm* — Eversheds Sutherland (US) LLP

(57) ABSTRACT

The disclosure provides some embodiments for securing long training field (LTF) sequence. A responding station (RSTA) configures a location management report (LMR) frame. The LMR frame is configured to include an LMR in respect of a previous measurement, and data to be used to generate a null data packet (NDP) for a current measurement that is to be performed following the previous measurement. The RSTA further encrypts the LMR frame using protected management frames (PMF) scheme, and transmits the encrypted LMR frame to an initiating station (ISTA) for generating an LTF sequence for the current measurement. In response to receiving an NDP announcement (NDPA) and an NDP for the current measurement from the ISTA, the RSTA generates an NDP for the current measurement based on the NDPA and the data using CCMP, and transmits the NDP to the ISTA.

10 Claims, 20 Drawing Sheets

(51) Int. Cl.
  *H04W 12/06*    (2021.01)
  *H04W 12/10*    (2021.01)
  *G01S 13/76*    (2006.01)
  *G01S 13/82*    (2006.01)
  *H04W 12/02*    (2009.01)

(52) U.S. Cl.
  CPC .......... *G01S 13/825* (2013.01); *H04L 9/3226* (2013.01); *H04W 12/02* (2013.01); *H04W 12/06* (2013.01); *H04W 12/10* (2013.01); *H04L 2209/38* (2013.01); *H04L 2209/80* (2013.01)

(56) References Cited

U.S. PATENT DOCUMENTS

| | | | |
|---|---|---|---|
| 2011/0075607 A1* | 3/2011 | Kim | H04B 7/0417 370/328 |
| 2013/0107916 A1* | 5/2013 | Liu | H04B 7/0452 375/219 |
| 2015/0065088 A1* | 3/2015 | Wu | H04L 9/0844 455/411 |
| 2015/0222346 A1* | 8/2015 | Garrett | H04B 7/0623 370/329 |
| 2017/0149799 A1* | 5/2017 | Vamaraju | G01S 13/767 |
| 2017/0289933 A1* | 10/2017 | Segev | H04B 17/27 |
| 2018/0049027 A1* | 2/2018 | Abraham | H04W 12/069 |
| 2018/0115424 A1* | 4/2018 | Bhandaru | H04L 9/0844 |
| 2019/0014466 A1* | 1/2019 | Seok | H04W 12/04 |
| 2019/0014491 A1* | 1/2019 | Seok | H04W 4/00 |

\* cited by examiner

ENCRYPTION OF MANAGEMENT FRAMES FOR SECURING LONG TRAINING FIELD SEQUENCE GENERATION AND SCHEME FOR TRANSMITTING SOUNDING SIGNAL INDICATIONS

RELATED APPLICATIONS

This patent claims priority to and, the benefit of, the earlier filing dates of U.S. Provisional Patent Application Ser. No. 62/580,307, filed on Nov. 1, 2017, and U.S. Provisional Patent Application Ser. No. 62/592,273, filed on Nov. 29, 2017. U.S. Provisional Patent Application Ser. No. 62/580,307 and U.S. Provisional Patent Application Ser. No. 62/592,273 are hereby incorporated herein by reference in their entireties.

TECHNICAL FIELD

This disclosure is related generally to location determination using Fine Timing Measurement (FTM) procedure, and more specifically to location determination using FTM protocol with secured long training field (LTF) sequence generation.

BACKGROUND ART

Security protection is essential for some applications of location determination in wireless communication, such as door opening and screen unlocking. Wi-Fi CERTIFIED Location™, based on IEEE 802.11 Fine Timing Measurement (FTM), delivers meter-level accuracy for indoor device location data. If an attacker knows a format of a sounding signal used in FTM procedure, the attacker can masquerade a ranging device to send a spoofed sounding signal earlier than the actual ranging device sending a real sounding signal. Therefore, the ranging device has to encrypt the sounding signal. In addition, a sounding signal indication (SSI) for the sounding signal also needs to be protected to prevent the attacker from knowing the format of the sounding signal to be sent by the ranging device.

Currently, a null data packet announcement (NDPA) and a trigger frame are used to carry an initialization vector (IV) in a single-user (SU) ranging protocol and a multi-user (MU) ranging protocol, respectively. Neither the NDPA nor the trigger frame is attached with a message integrity check (MIC) code, since attaching an MIC code to the NDPA or the trigger frame may change the format of the NDPA or the trigger frame.

BRIEF DESCRIPTION OF THE DRAWINGS

Other features and advantages of the disclosure will become apparent in the following detailed description of the embodiments with reference to the accompanying drawings, of which.

DESCRIPTION OF THE EMBODIMENTS

Figure 1:
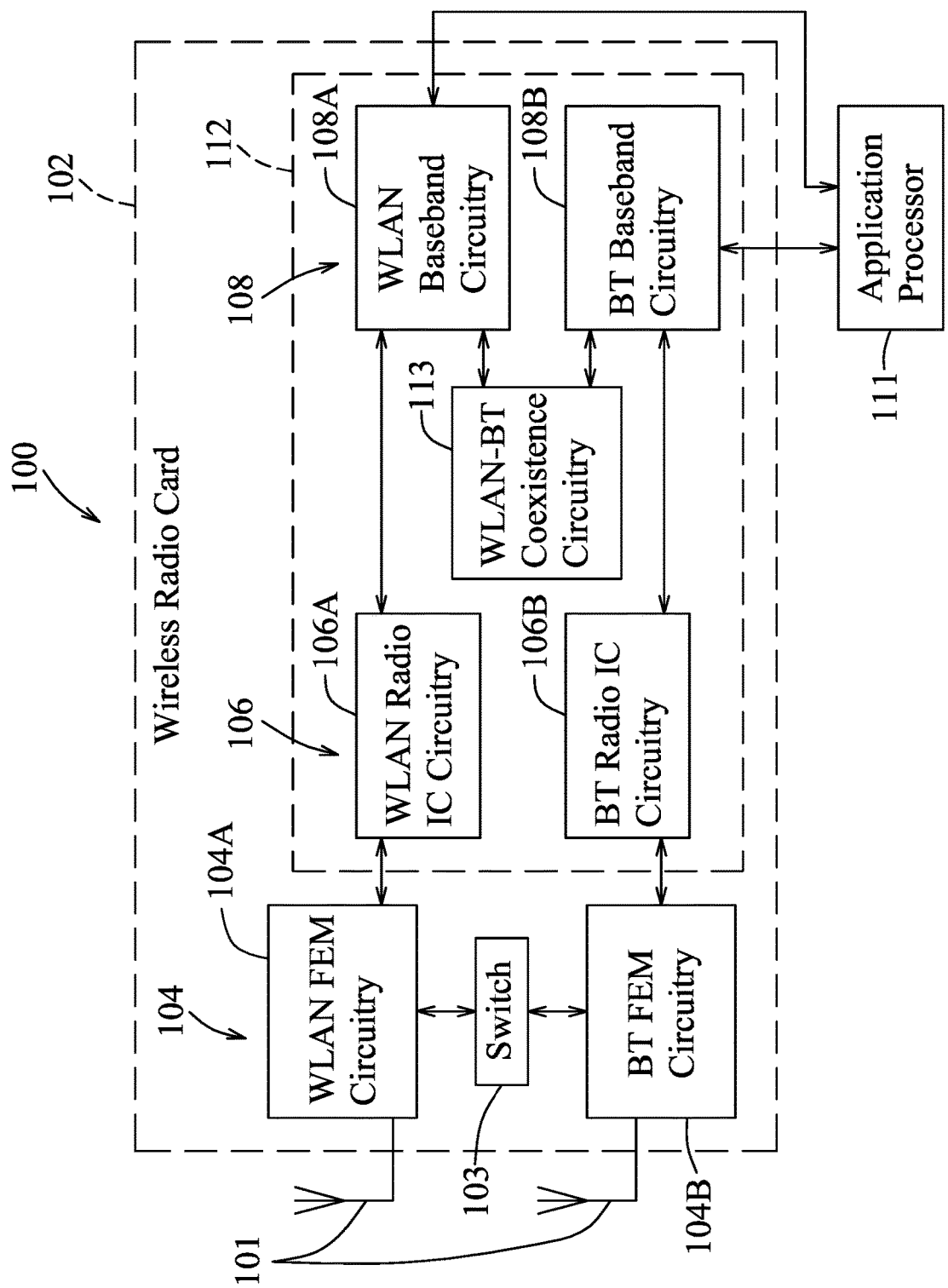
FIG. 1 is a block diagram of a radio architecture according to some embodiments.

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology used herein is for the purpose of describing particular examples only and is not intended to be limiting.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the expression "A or B" means A, B, or A and B.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

As used herein, the use of the ordinal adjectives "first", "second", "third", etc. to describe an object merely indicates that different instances of like objects are being referred to, and is not intended to imply that the objects so described must be in a given sequence, either temporally, spatially, in ranking, or in any other manner.

Some embodiments may be used in conjunction with various devices and systems, for example, a user equipment (UE), a mobile device, a wireless station (STA), a personal computer (PC), a mobile computer, a laptop computer, a notebook computer, a tablet computer, a handheld computer, a sensor device, an Internet of Things (IoT) device, a wearable device, a handheld device, a personal digital assistant (PDA) device, an on-board device, an off-board device, a hybrid device, a vehicular device, a non-vehicular device, a consumer device, a wireless communication station, a wireless communication device, an access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with a WLAN, e.g., a Wi-Fi network. Other embodiments may be used in conjunction with any other suitable wireless communication network, for example, a wireless area network, a WPAN, a WVAN and the like. Some embodiments are described herein with respect to Wi-Fi communication. However, other embodiments may be implemented with respect to any other communication scheme, network, standard and/or protocol.

As used herein, the term "circuitry" may refer to, be part of, or include, an application specific integrated circuit (ASIC), an integrated circuit, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may include logic, at least partially operable in hardware.

FIG. 1 is a block diagram of a radio architecture 100 in accordance with some embodiments. The radio architecture 100 includes radio front-end module (FEM) circuitry 104, radio IC circuitry 106 and baseband circuitry 108. The radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

The radio FEM circuitry 104 may include WLAN or Wi-Fi FEM circuitry 104A and BT FEM circuitry 104B. The WLAN FEM circuitry 104A includes a receive signal path having circuitry to operate on WLAN RF signals received from one or more antennas 101, to amplify the received signals and to provide the amplified versions of the received signals to the radio IC circuitry 106 for further processing. The BT FEM circuitry 104B includes a receive signal path having circuitry to operate on BT RF signals received from one or more antennas 101, to amplify the received signals and to provide the amplified versions of the received signals to the radio IC circuitry 106 for further processing. The WLAN FEM circuitry 104A also includes a transmit signal path which may include circuitry configured to amplify WLAN signals provided by the radio IC circuitry 106 for wireless transmission by one or more of the antennas 101. In addition, the BT FEM circuitry 104B also includes a transmit signal path having circuitry to amplify BT signals provided by the radio IC circuitry 106 for wireless transmission by the one or more antennas 101. Although the WLAN FEM circuitry 104A and the BT FEM circuitry 104B are shown as being distinct from one another in FIG. 1, embodiments are not so limited.

The radio IC circuitry 106 includes WLAN radio IC circuitry 106A and BT radio IC circuitry 106B. The WLA radio IC circuitry 106A includes a receive signal path having circuitry to down-convert WLAN RF signals received from the WLAN FEM circuitry 104A and to provide baseband signals to the baseband circuitry 108. The BT radio IC circuitry 106B includes a receive signal path having circuitry to down-convert BT RF signals received from the BT FEM circuitry 104B and to provide baseband signals to the baseband circuitry 108. The WLAN radio IC circuitry 106A includes a transmit signal path having circuitry to up-convert WLAN baseband signals provided by the baseband circuitry 108 and to provide WLAN RF output signals to the WLAN FEM circuitry 104A for subsequent wireless transmission by one or more antennas 101. The BT radio IC circuitry 106B includes a transmit signal path having circuitry to up-convert BT baseband signals provided by the baseband circuitry 108 and to provide BT RF output signals to the BT FEM circuitry 104B for subsequent wireless transmission by the one or more antennas 101. As shown in FIG. 1, although the WLAN radio IC circuitry 106A and the BT radio IC circuitry 106B are shown as being distinct from one another, embodiments are not so limited.

The baseband circuitry 108 includes a WLAN baseband circuitry 108A and a BT baseband circuitry 108B. The WLAN baseband circuitry 108A includes a memory, such as, a set of RAM arrays in a Fast Fourier Transform or Inverse Fast Fourier Transform block (not shown) of the WLAN baseband circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to generate corresponding WLAN or BT baseband signals for the transmit signal path of the radio IC circuitry 106. Each of the WLAN and BT baseband circuitries 108A and 108B may further include physical layer (PHY) circuitry and medium access control layer (MAC) circuitry, and may further interface with an application processor 111 for generation and processing of the baseband signals and for controlling operations of the radio IC circuitry 106. The BT baseband circuitry 108B is compliant with a Bluetooth connectivity standard such as Bluetooth, Bluetooth 4.0 or Bluetooth 5.0, or any other iteration of the Bluetooth Standard.

Referring still to FIG. 1, the radio architecture 100 further includes WLAN-BT coexistence circuitry 113. The WLAN-BT coexistence circuitry 113 includes logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, some embodiments may include one or more antennas shared between the WLAN FEM circuitry 104A and the BT FEM circuitry 104B, or more than one antenna connected to one of the WLAN FEM circuitry 104A and the BT FEM circuitry 104B.

In some embodiments, the radio FEM circuitry 104, the radio IC circuitry 106 and the baseband circuitry 108 are provided on a single radio card, such as a wireless radio card 102. In some other embodiments, the one or more antennas 101, the radio FEM circuitry 104 and the radio IC circuitry 106 are provided on a single radio card. In some other embodiments, the radio IC circuitry 106 and the baseband circuitry 108 are provided on a single chip or integrated circuit (IC), such as an IC 112.

In some embodiments, the wireless radio card 102 includes a WLAN radio card, and is configured for Wi-Fi communication. In some of these embodiments, the radio architecture 100 is configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some of these multi-carrier embodiments, the radio architecture 100 is a part of a Wi-Fi communication station (STA) such as a wireless access point (AP), a base station or a mobile device including a Wi-Fi device. In some of these embodiments, the radio architecture 100 is configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11ac and/or IEEE 802.11ax standards and/or proposed specifications for WLANs. In some embodiments, the radio architecture 100 is configured for high-efficiency Wi-Fi (HEW) communication in accordance with the IEEE 802.11ax standard, and is configured to communicate in accordance with an OFDMA technique.

In some other embodiments, the radio architecture 100 is configured to transmit and receive signals transmitted using one or more other modulation techniques, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

In some embodiments, the radio-architecture 100 may include other radio cards, such as a cellular radio card configured for cellular (e.g., 3GPP such as LTE, LTE-Advanced or 5G communications).

Figure 2:
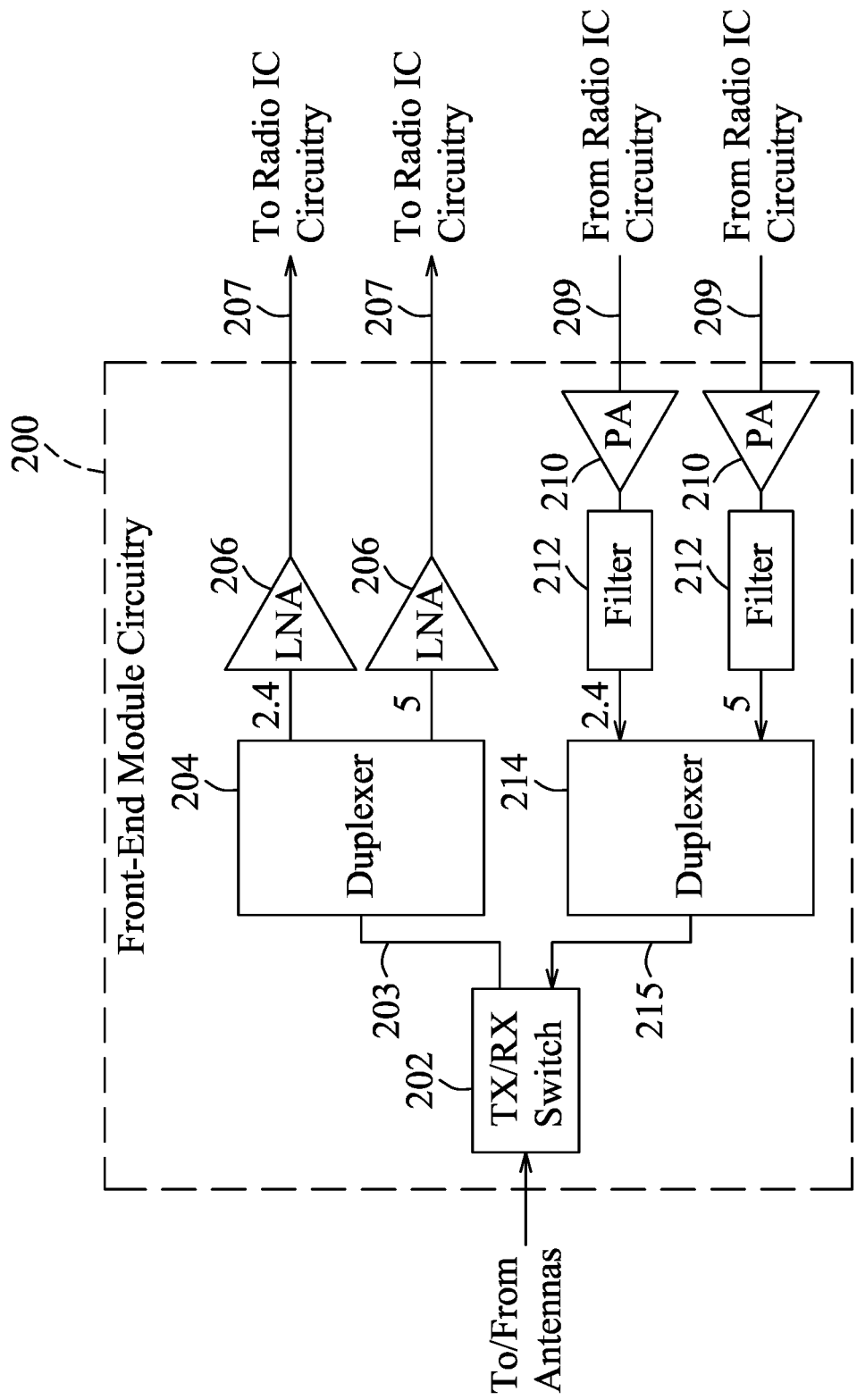
FIG. 2 illustrates a front-end module circuitry for use in the radio architecture of FIG. 1 according to some embodiments.

FIG. 2 illustrates FEM circuitry 200 according to some embodiments. The FEM circuitry 200 is one example of circuitry suitable for use as the WLAN/BT FEM circuitry 104A/104B of FIG. 1. In some embodiments, the FEM circuitry 200 includes a TX/RX switch 202 to switch between transmit mode and receive mode. The FEM circuitry 200 includes a receive signal path and a transmit signal path. The receive signal path of the FEM circuitry 200 includes a low-noise amplifier (LNA) 206 to amplify received RF signals 203 and provide the amplified received RF signals 207 as an output (e.g., to the radio IC circuitry 106 of FIG. 1). The transmit signal path of the FEM circuitry 200 includes a power amplifier (PA) 210 to amplify input RF signals 209 (e.g., provided by the radio IC circuitry 106 of FIG. 1), and one or more filters 212, such as band-pass filters (BPFs), low-pass filters (LPFs) or other types of filters, to generate RF signals 215 for subsequent transmission (e.g., by one or more of the antennas 101 of FIG. 1).

In some dual-mode embodiments for Wi-Fi communication, the FEM circuitry 200 is configured to operate in either the 2.4 GHz frequency spectrum or the 5 GHz frequency spectrum. In these embodiments, the receive signal path of the FEM circuitry 200 further includes a receive signal path duplexer 204 to separate the signals from each spectrum as well as to provide a separate LNA 206 for each spectrum. In these embodiments, the transmit signal path of the FEM circuitry 200 includes a PA 210 and a filter 212 for each frequency spectrum and a transmit signal path duplexer 214 to provide the signals of one of the different spectrums onto a single transmit path.

Figure 3:
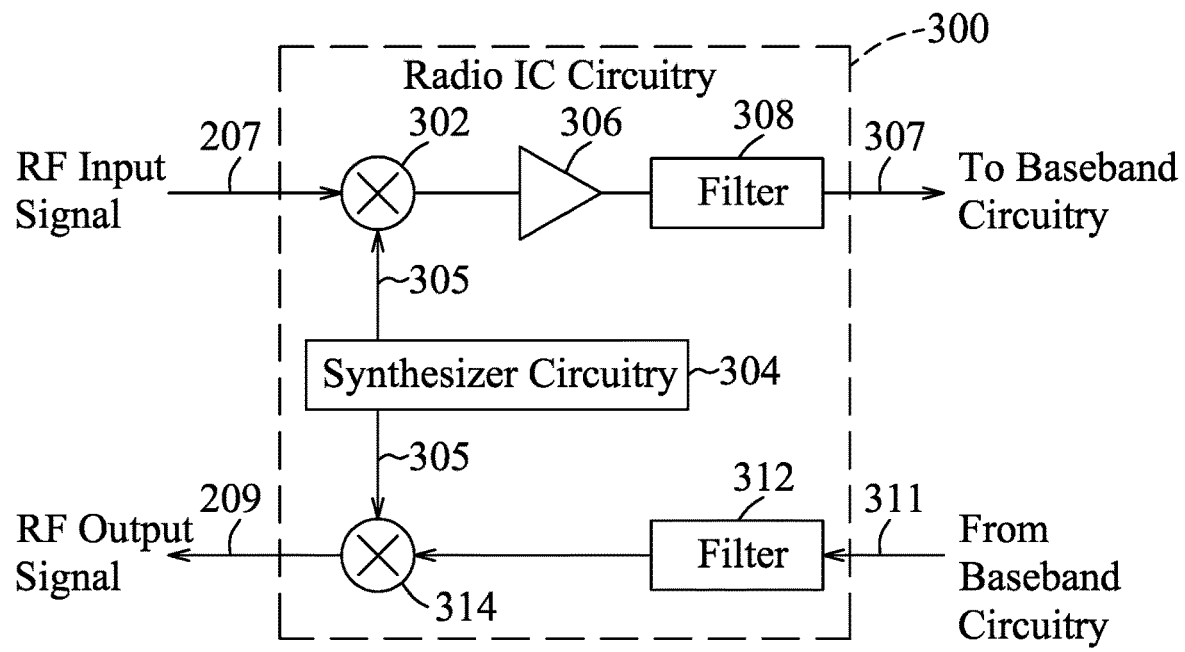
FIG. 3 illustrates a radio IC circuitry for use in the radio architecture of FIG. 1 according to some embodiments.

FIG. 3 illustrates radio IC circuitry 300 according to some embodiments. The radio IC circuitry 300 is one example of circuitry suitable for use as the WLAN/BT radio IC circuitry 106A/106B of FIG. 1.

In some embodiments, the radio IC circuitry 300 includes a receive signal path and a transmit signal path. The receive signal path of the radio IC circuitry 300 includes at least mixer circuitry 302 (e.g., down-conversion mixer circuitry), amplifier circuitry 306 and filter circuitry 308. The transmit signal path of the radio IC circuitry 300 includes at least filter circuitry 312 and mixer circuitry 314 (e.g., up-conversion mixer circuitry). The radio IC circuitry 300 further includes synthesizer circuitry 304 for synthesizing a frequency 305 to be used by the mixer circuitry 302 and the mixer circuitry 314. FIG. 3 illustrates only a simplified version of radio IC circuitry. In some embodiments, each depicted circuitry may include more than one component. For instance, the mixer circuitry 302/314 may include one or more mixers, and the filter circuitry 308/312 may include one or more filters, such as one or more BPFs and/or LPFs according to application needs. For example, the mixer circuitry of direct-conversion type may include two or more mixers.

In some embodiments, the mixer circuitry 302 is configured to down-convert RF signals 207 received from the radio FEM circuitry 104 of FIG. 1 based on the synthesized frequency 305 provided by the synthesizer circuitry 304. The amplifier circuitry 306 is configured to amplify the down-converted signals, and the filter circuitry 308 includes a LPF configured to remove unwanted signals from the down-converted signals to generate output baseband signals 307. The output baseband signals 307 are provided to the baseband circuitry 108 of FIG. 1. In some embodiments, the mixer circuitry 302 may include passive mixers.

In some embodiments, the mixer circuitry 314 is configured to up-convert input baseband signals 311 based on the synthesized frequency 305 provided by the synthesizer circuitry 304 to generate RF output signals 209 for the FEM circuitry 104. The baseband signals 311 are provided by the baseband circuitry 108 and are filtered by the filter circuitry 312. The filter circuitry 312 may include a LPF or a BPF.

In some embodiments, the output baseband signals 307 and the input baseband signals 311 may be analog baseband signals. In some alternate embodiments, the output baseband signals 307 and the input baseband signals 311 may be digital baseband signals, and the radio IC circuitry 300 may further include analog-to-digital converter (ADC) and digital-to-analog converter (DAC) circuitry.

In some embodiments, the synthesizer circuitry 304 is a fractional-N synthesizer or a fractional N/N+1 synthesizer, and other types of frequency synthesizers may be suitable. For example, the synthesizer circuitry 304 may be a delta-sigma synthesizer, a frequency multiplier, or a synthesizer including a phase-locked loop with a frequency divider. According to some embodiments, the synthesizer circuitry 304 includes digital synthesizer circuitry. In some embodiments, frequency input into the synthesizer circuitry 304 may be provided by a voltage controlled oscillator (VCO). A divider control input may further be provided by either the baseband circuitry 108 or the application processor 111 of FIG. 1 depending on the desired output frequency 305. In some embodiments, a divider control input (e.g., N) may be determined from a look-up table (e.g., within a Wi-Fi card) based on a channel number and a channel center frequency as determined or indicated by the application processor 111. In some embodiments, the synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency).

Figure 4:
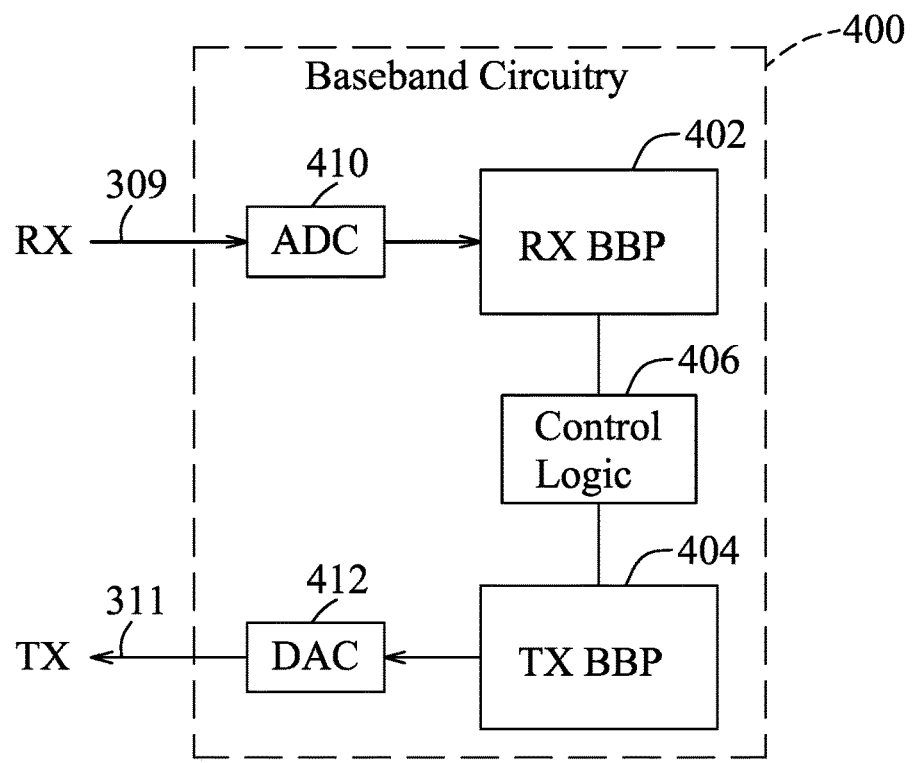
FIG. 4 illustrates a baseband processing circuitry for use in the radio architecture of FIG. 1 according to some embodiments.

FIG. 4 illustrates a functional block diagram of baseband circuitry 400 according to some embodiments. The baseband circuitry 400 is one example of circuitry suitable for use as the baseband circuitry 108 of FIG. 1. The baseband circuitry 400 includes a receive baseband processor (RX BBP) 402 for processing receive baseband signals 309 provided by the radio IC circuitry 106 of FIG. 1, and a transmit baseband processor (TX BBP) 404 for generating transmit baseband signals 311 for the radio IC circuitry 106. The baseband circuitry 400 further includes control logic 406 for coordinating operations of the baseband circuitry 400.

In some embodiments where analog baseband signals are exchanged between the baseband circuitry 400 and the radio IC circuitry 106, the baseband circuitry 400 may include an ADC 410 to convert analog baseband signals received from the radio IC circuitry 106 to digital baseband signals for processing by the RX BBP 402. In these embodiments, the baseband circuitry 400 may further include a DAC 412 to convert digital baseband signals from the TX BBP 404 to analog baseband signals.

Referring back to FIG. 1, in some embodiments, each of the antennas 101 may include one or more directional or omnidirectional antennas, including, for example, dipole antennas, monopole antennas, patch antennas, loop antennas, microstrip antennas or other types of antennas suitable for transmission of RF signals. The antennas 101 may each include a set of phased-array antennas.

Although the radio architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Secured LTF Sequence Generation

Currently, physical level measurement based on IEEE 802.11 is not protected against spoofing. However, some mechanisms have been provided to protect information transmitted between an initiating station (ISTA) and a responding station (RSTA).

Figure 5:
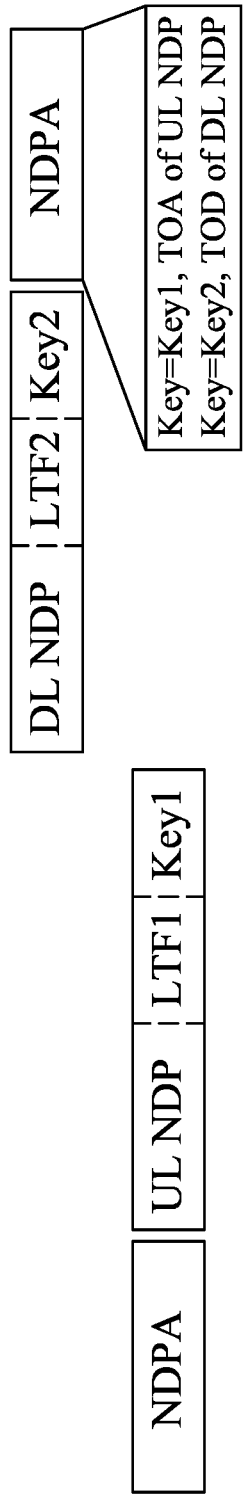
FIG. 5 illustrates a frame structure used to transmit keys between an initiating station and a responding station.

Referring to FIG. 5, the ISTA (e.g., a user equipment) first transmits a null data packet announcement (NDPA) to the RSTA in a control frame, and then transmits a null data packet (NDP) (e.g., uplink NDP (UL NDP)) and a long training field (LTF) sequence (LTF1) to the RSTA in a sounding frame. In the frame structure shown in FIG. 5, the ISTA further transmits, at the end of the sounding frame, a first key (Key1) that is used to encrypt the LTF sequence (LTF1). On the other hand, the RSTA (e.g., an access point) transmits an NDP (e.g., downlink NDP (DL NDP)) and an LTF sequence (LTF2) to the ISTA in a sounding frame in response to receipt of the NDPA and the NDP (UL NDP) from the ISTA, and then transmits a location management report (LMR) to the ISTA. Generally, the LMR includes time of arrival (TOA) of the UL NDP and time of departure (TOD) of the DL NDP. The RSTA also transmits, at the end of the sounding frame, a second key (Key2) that is used to encrypt the LTF sequence (LTF2). By this way, an attacker cannot transmit a spoofed sounding signal before the real sounding signal (including the NDP and the LTF sequence) is transmitted since the key used to encrypt the LTF sequence is transmitted after the real sounding signal in the sounding frame.

However, a receiver of the sounding signal has to store the NDP and the LTF sequence in a buffer and is only capable of decoding the sounding signal after receiving the key at the end of the sounding frame, creating a bottleneck at the receiver. Furthermore, the key and the sounding signal have to be transmitted via separate receiving paths, increasing complexity of the system. In addition, reuse of existing basebands is limited since the NDP currently defined in IEEE 802.11ax and 802.11ac standards does not include a data field.

Figure 6:
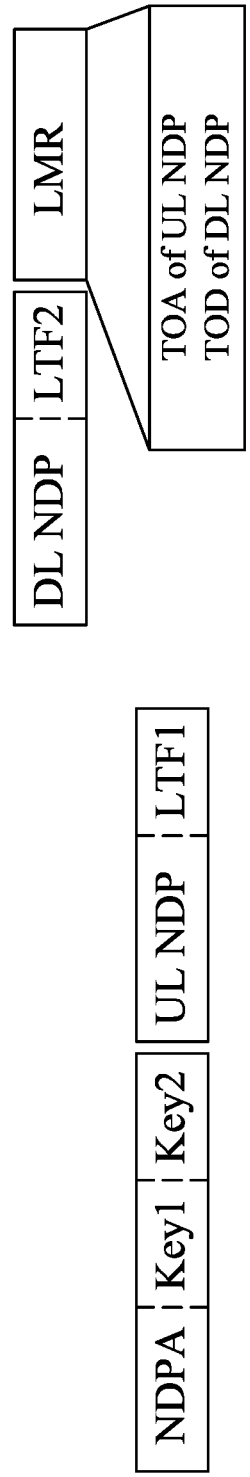
FIG. 6 illustrates another frame structure used to transmit keys from an initiating station to a responding station.

Referring to FIG. 6, another mechanism for protecting information transmitted between an ISTA and an RSTA is to encrypt keys in a control frame (e.g., in the NDPA). As shown in FIG. 6, the first key (Key1) for encrypting the LTF sequence (LTF1) and the second key (Key2) for encrypting the LTF sequence (LTF2) are both transmitted in the control frame. However, the current IEEE 802.11 standards do not support a control frame to be encrypted due to the short response time (normally, short interframe space, SIFS). In addition, encrypting information in the NDPA in the sequence results in a critical path at a receiver side of the keys, and sounding waveform samples (i.e., the NDP) have to be buffered until decryption process completes.

According to one embodiment of this disclosure, protected management frames (PMF) scheme is used to encrypt an LMR frame and an initial FTM frame so that the LMR frame and the initial FTM frame are transmitted in a secure manner. Moreover, the LMR frame is configured to include data that is to be used to generate a null data packet (NDP) for the sounding sequence in the next ranging measurement. In particular, an apparatus for securing LTF sequence includes circuitry to cause an RSTA to configure an LMR frame including an LMR (i.e., FTM response) in respect of a previous measurement, to encrypt the LMR frame using PMF scheme, and to transmit the encrypted LMR frame to an ISTA for generating LTF sequences for a current measurement that is to be performed following the previous measurement. The LMR frame in respect of the previous measurement is configured to further include a measurement identifier (ID) associated with the current measurement, and data that is to be used to generate an NDP for the current measurement. The measurement ID makes sure that both sides (ISTA and RSTA) are using the same sequence (i.e., in the same measurement). The data to be used to generate an NDP includes, for example, an initialization vector (IV) and a key. For example, the LTF sequences are generated using counter mode cipher block chaining message authentication code protocol (CCMP). In some embodiments, both the RSTA and the ISTA use the same data to generate the LTF sequences, and thus resultant vectors generated respectively by the RSTA and the ISTA using CCMP will be the same. Moreover, since the data is transmitted in the LMR frame that is encrypted using PMF scheme, the data is not exposed to an eavesdropper.

Figure 7:
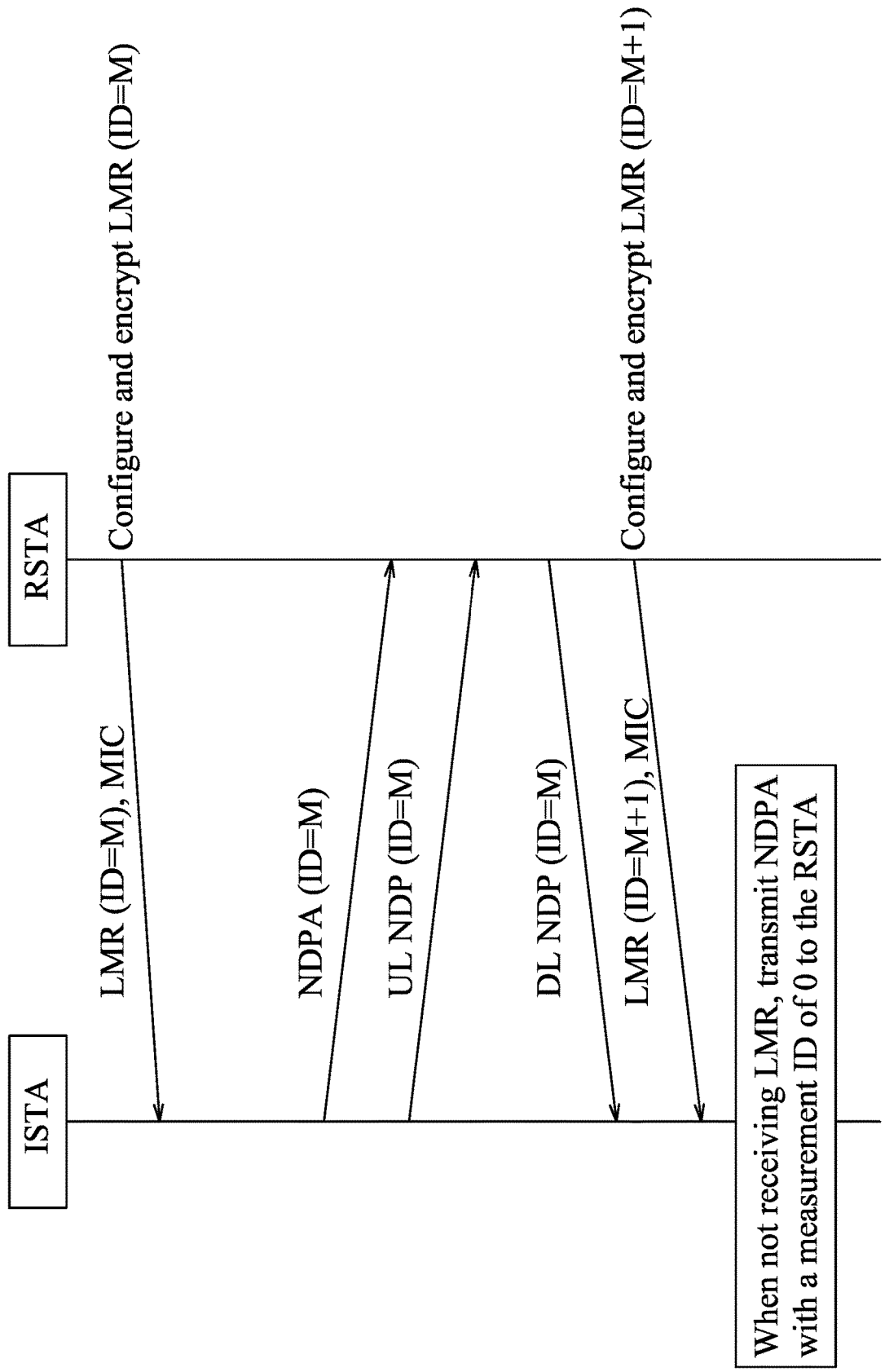
FIG. 7 illustrates an example of a fine timing measurement procedure for single-user protocol according to an embodiment.

FIG. 7 illustrates an FTM procedure with protected LTF sequences for a single-user (SU) ranging protocol. The RSTA first configures the LMR frame to include the LMR in respect of the previous measurement, and encrypts the LMR frame using PMF scheme with a transient key. The LMR frame further includes the measurement ID associated with the current measurement (ID=M), and the data to be used by the RSTA and the ISTA to generate an NDP. The data to be used to generate an NDP includes an uplink IV, uplink input data and an uplink key to be used by the ISTA to generate an uplink NDP (UL NDP), and a downlink IV, downlink input data and a downlink key to be used by the RSTA to generate a downlink NDP (DL NDP). In some embodiments, the uplink IV, the uplink input data and the uplink key are the same as the downlink IV, the downlink input data and the downlink key, respectively. In some embodiments, for each measurement, the RSTA randomly generates an initialization vector, the RSTA configures the LMR frame to only include the IV without the key and the input data that are the same for each measurement. In some embodiments, for each measurement, the RSTA randomly generates an initialization vector, input data and a key.

The RSTA further generates a message integrity check (MIC) code based on the transient key that is used to encrypt the LMR frame. Then, the RSTA transmits the encrypted LMR frame and the MIC code to the ISTA.

After receiving the encrypted LMR frame in respect of the previous measurement from the RSTA, the ISTA transmits, to the RSTA, an NDPA having the measurement ID for the current measurement (ID=M). Subsequently, the ISTA generates the UL NDP based on the uplink IV, the uplink input data and the uplink key included in the LMR frame with the measurement ID of M using CCMP, and transmits the UL NDP to the RSTA. In response to receiving the NDPA and the UL NDP from the ISTA, the RSTA generates the DL NDP based on the downlink IV, the downlink input data and the downlink key, and transmits the DL NDP to the ISTA. Further, the RSTA configures and encrypts an LMR frame in respect of the current measurement in the above-mentioned manner. It should be noted that the LMR frame in respect of the current measurement includes a measurement ID for a next measurement (ID=M+1) to be performed following the current measurement.

There are various embodiments for generating actual cipher blocks of the LTF sequences. For example, the LTF sequences are generated using an existing CCM block (using CCMP-128 algorithm). Each LTF sequence is generated using three inputs (including the initialization vector (IV), the input data and the key), and each input is 128 bits long. The input data is the first 16 bytes of data, and the CCM block uses this input data to generate an actual input data string having a length equaling that of requested sequence. The actual input data string may repeat the input data multiple times until the length of the requested sequence is achieved. Each time a byte of the input data is reused, the byte is increased by 1.

By providing a one cycle delay operation of the measurement cycle in the IFTM and the LMR (i.e., the data for generating the LTF sequences in the $N^{th}$ measurement is provided in the LMR frame of the $(N-1)^{th}$ measurement), there is no critical path constraint on decryption and protection of the message providing the data for generating the LTF.

In case the data for generating the LTF sequence is missed (e.g., the LMR frame was not correctly received at the end of the previous measurement) or different measurement IDs are used by the ISTA and the RSTA (e.g., the RSTA transmitted the LMR frame including a measurement ID of 15, but the ISTA transmits the NDPA having a measurement ID of 14), pre-defined sequences are used (instead of the expected sequences) and new input data for the LTF sequence generation is generated and transmitted using the LMR frame.

In the SU ranging protocol, the ISTA may signal the RSTA that the data for generating the LTF sequence is missed by indicating so in an NDPA. In some embodiments, after transmitting the encrypted LMR frame of the previous measurement to the ISTA, the RSTA configures a new LMR frame to include a measurement ID associated with a next measurement that is to be performed following the current measurement in response to receiving, from the ISTA, an NDPA with a measurement ID of 0. Then, the RSTA encrypts the new LMR frame using PMF scheme, and transmits the encrypted new LMR frame to the ISTA.

Referring to FIG. 7, when the ISTA does not receive the LMR frame including the measurement ID of M+1, the ISTA transmits an NDPA with a measurement ID of 0 to the RSTA. In response to receiving the NDPA with the measurement ID of 0, the RSTA configures a new LMR frame to include a measurement ID of M+2 that is associated with the next measurement, and transmits the encrypted new LMR frame to the ISTA. In particular, the RSTA never re-transmits an LMR frame with the same data for generating the LTF sequence.

In some embodiments, in response to receiving, from the ISTA, an NDPA with a measurement ID that is not identical to the measurement ID included in the LMR frame, the RSTA generates a predetermined NDP, transmits the predetermined NDP to the ISTA, configures a new LMR frame to inform the ISTA to ignore previously received NDP and LMR frame, and transmit the new LMR frame to the ISTA.

Figure 8A:
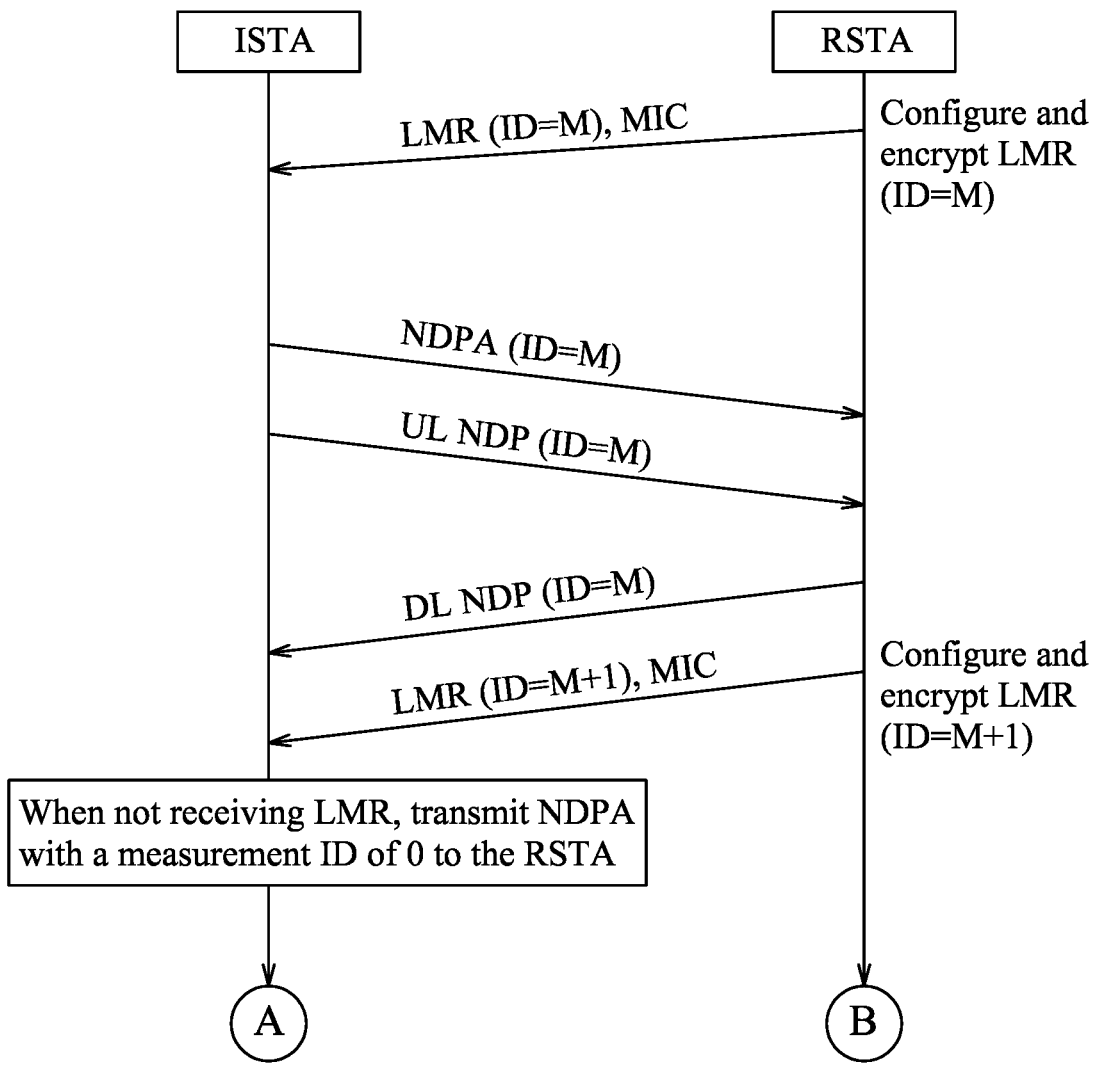
FIGS. 8A and 8B cooperatively illustrate another example of a fine timing measurement procedure for single-user protocol according to an embodiment.
Figure 8B:
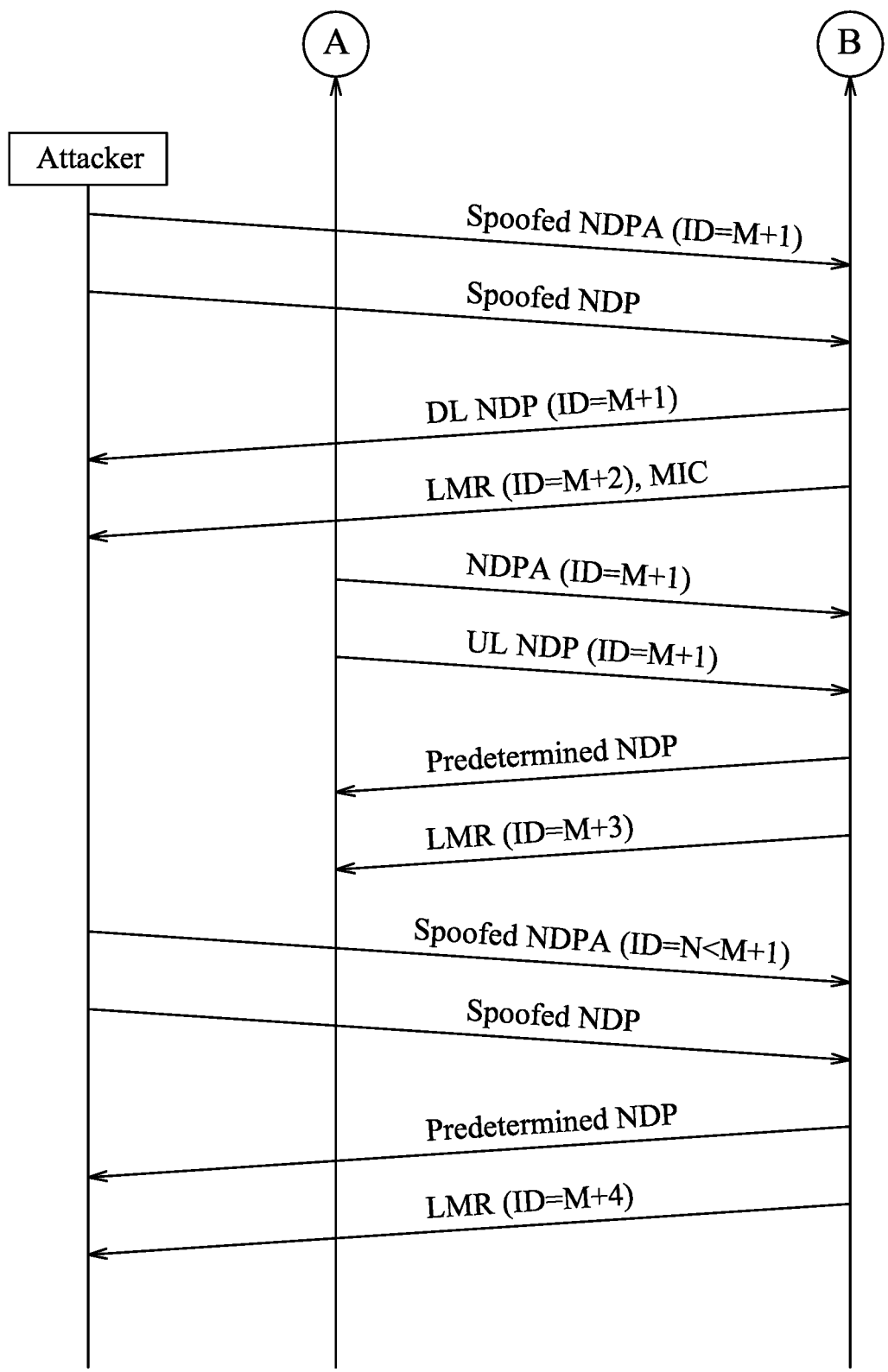

FIGS. 8A and 8B cooperatively illustrate a scheme of error recovery of erroneous NDPA. The complete sequence and handling of incorrectly enumerated frames whether transmitted by a spoofer (attacker) or due to errors in the wireless medium (WM) can be seen in FIGS. 8A and 8B. When the attacker maliciously accesses the LMR frame with the measurement ID of M+1 and sends a spoofed NDPA with the measurement ID of M+1 and a spoofed NDP to the RSTA, the RSTA erroneously transmits the NDP with the measurement ID of M+1 and the LMR frame with the measurement ID of M+2 to the attacker in response to receiving the spoofed NDPA and NDP from the attacker. Afterward, the ISTA transmits the actual NDPA with the measurement ID of M+1 and the actual NDP to the RSTA. In response to receiving the NDPA with the measurement ID of M+1 from ISTA, the RSTA determines that the NDPA is out of order since the measurement ID (M+1) of the NDPA from the ISTA is not identical to the measurement ID (M+2) which the RSTA last outputted. Accordingly, the RSTA generates a predetermined NDP (known LTF sequence), and transmits the predetermined NDP to the ISTA. The RSTA further configures an LMR frame with a measurement ID of M+3, and transmits the same to the ISTA to inform the ISTA to ignore previously received NDP and LMR frame.

Figure 9A:
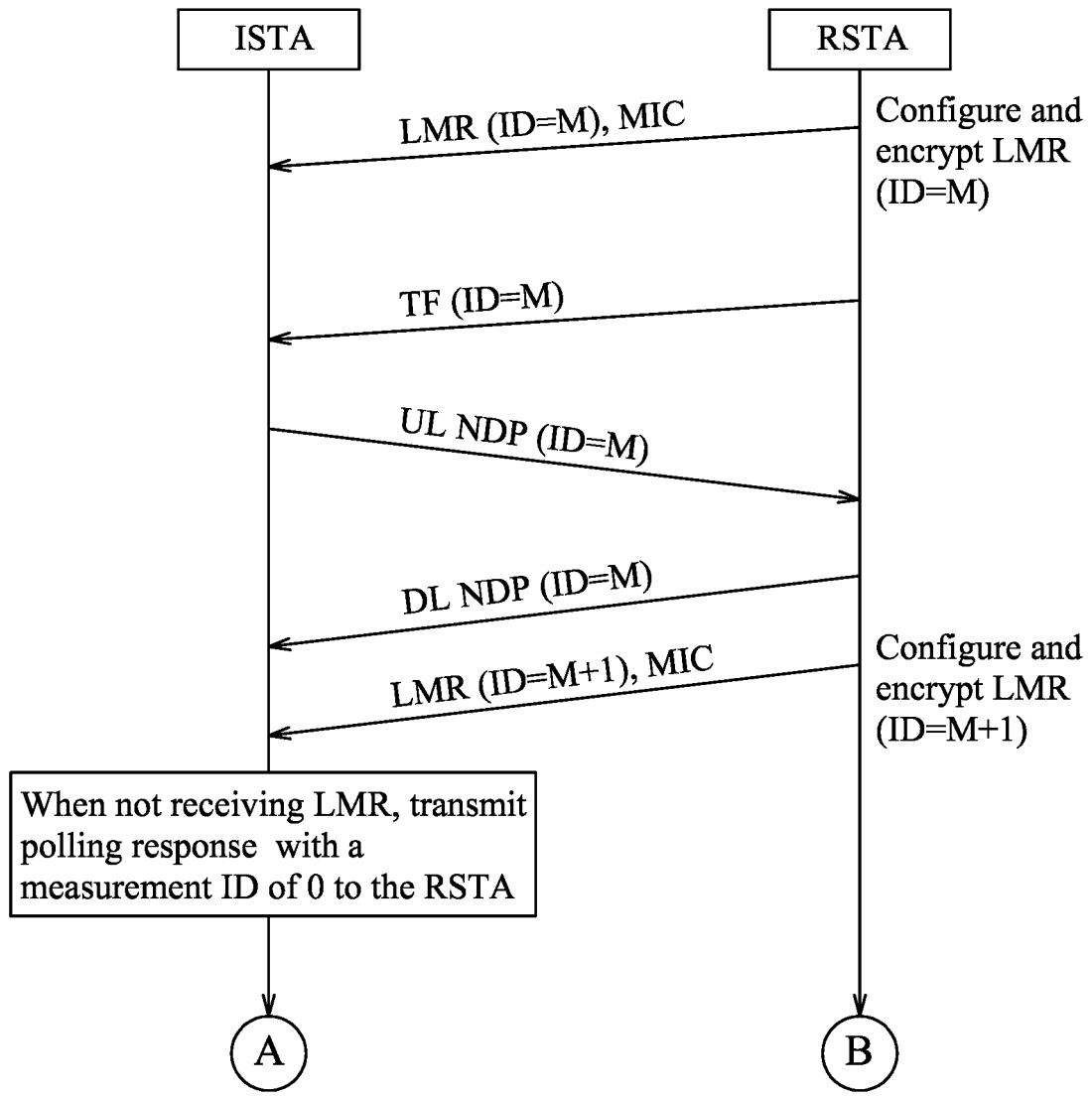
FIGS. 9A, 9B and 9C cooperatively illustrate an example of a fine timing measurement procedure for multi-user protocol according to an embodiment.
Figure 9B:
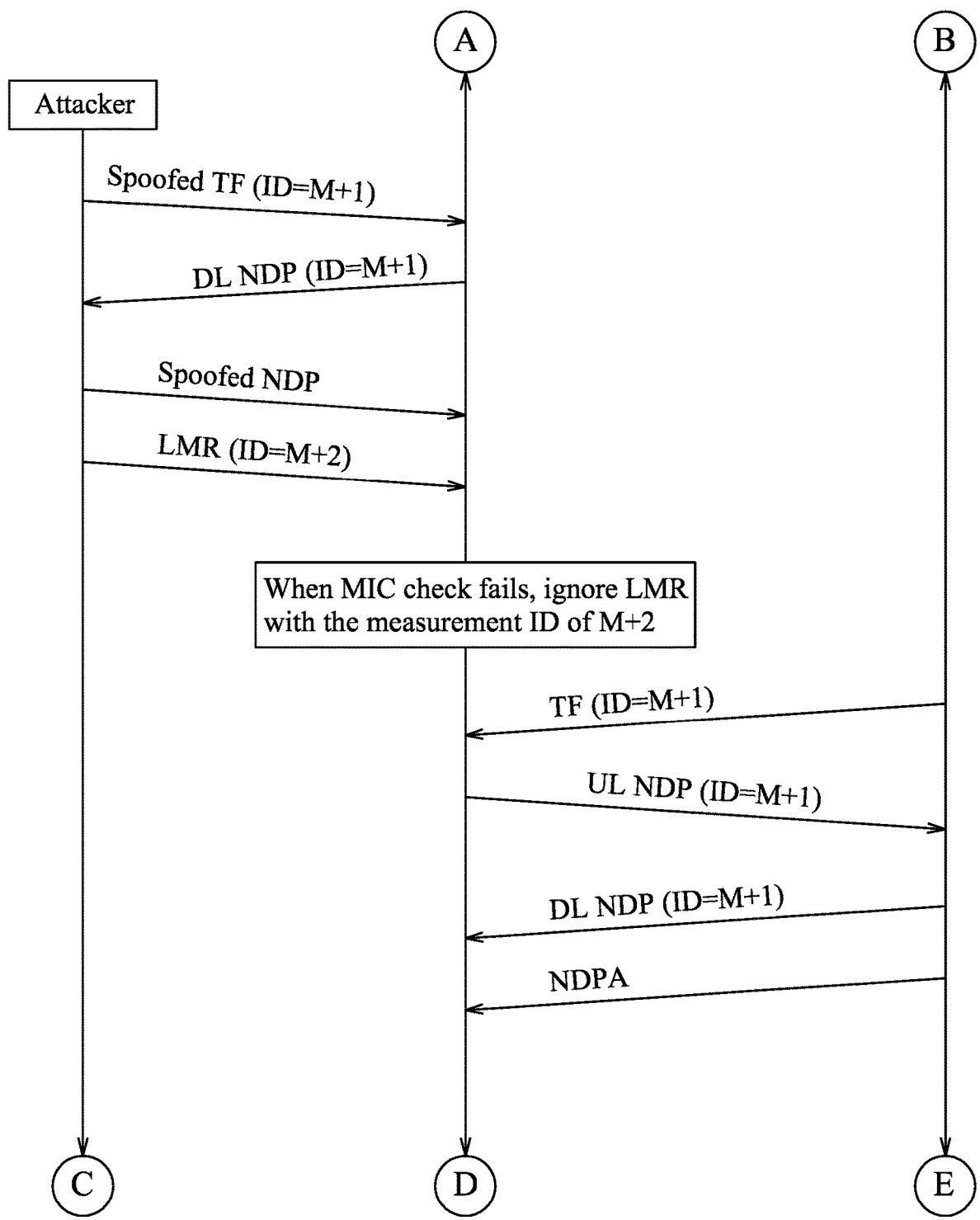
Figure 9C:
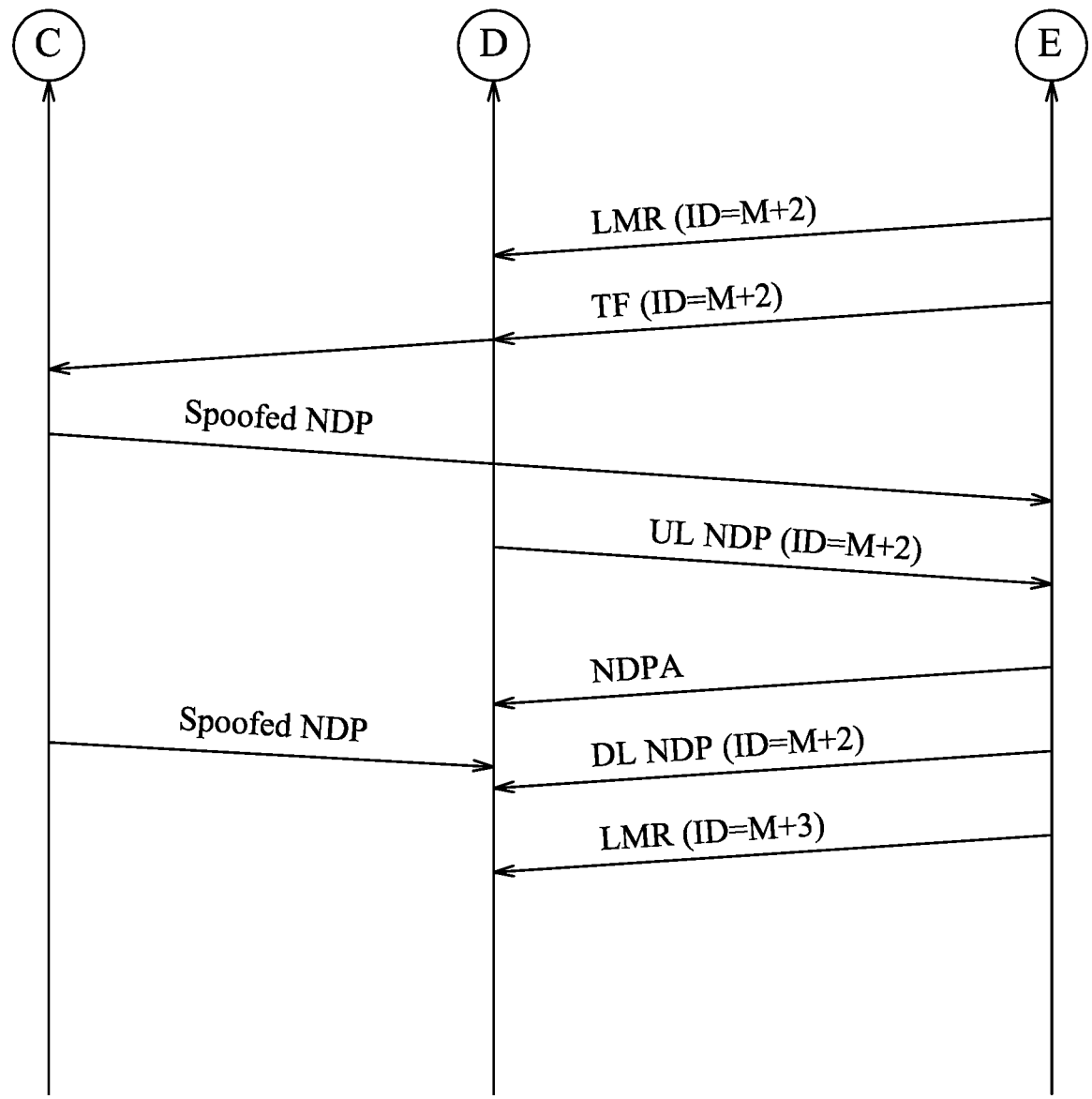

FIGS. 9A, 9B and 9C cooperatively illustrate a fine timing measurement (FTM) procedure for multi-user protocol according to an embodiment. Similar to the FTM procedure of FIG. 7, the RSTA first configures the LMR frame to include the LMR in respect of the previous measurement, and encrypts the LMR frame using PMF scheme with a transient key. The LMR frame further includes the measurement ID associated with the current measurement (ID=M), and the data to be used by the RSTA and the ISTA to generate an NDP. The RSTA further generates an MIC code based on the transient key that is used to encrypt the LMR frame. Then, the RSTA transmits the encrypted LMR frame and the MIC code to the ISTA. Subsequently, the RSTA generates a trigger frame (TF) for the current measurement (ID=M) and transmits the TF to the ISTA.

In response to receipt of the TF from the RSTA, the ISTA uses CCMP to generate an UL NDP based on the data included in the LMR frame (i.e., the uplink IV, the uplink input data and the uplink key), and transmits the UL NDP to the RSTA. Upon receiving the UL NDP from the ISTA, the RSTA generates a DL NDP based on the downlink IV, the downlink input data and the downlink key, and transmits the DL NDP to the ISTA. Further, the RSTA configures and encrypts an LMR frame in respect of the current measurement in the above-mentioned manner. It should be noted that the LMR frame in respect of the current measurement includes a measurement ID for a next measurement (ID=M+1) to be performed following the current measurement.

In the MU ranging protocol, the ISTA may signal the RSTA that the data for generating the LTF sequence is missed by indicating so in a polling response. In a case that the ISTA does not receive the LMR frame including the measurement ID of M+1, the ISTA transmits a polling response with a measurement ID of 0 to the RSTA. In response to receiving the polling response with the measurement ID of 0, the RSTA configures a new LMR frame to include a measurement ID of M+2 that is associated with the next measurement, and transmits the encrypted new LMR frame to the ISTA. In particular, the RSTA never re-transmits an LMR frame with the same data for generating the LTF sequence.

If an attacker sends a spoofed TF with the measurement ID of M+1 to the ISTA, the ISTA will erroneously transmit, to the attacker, a DL NDP that is generated based on the data included in the LMR frame with the measurement ID of M+1, and then the attacker transmits a spoofed NDP and a spoofed LMR frame with a measurement ID of M+2 to the ISTA. In this case, check of the MIC code should fail, so that the ISTA detects the LMR frame with the measurement ID of M+2 as a spoofing attempt and thus ignores the LMR frame with the measurement ID of M+2.

Protection of the ranging measurements is provided by the generation of new pseudo-random LTF sequence in each transmission. Bandwidth resources are allocated using an NDPA and a TF for the SU ranging protocol and the MU ranging protocol, respectively. Both the TF and the NDPA are control frames, which means 802.11 does not provide protection (encryption or integrity) to these frames due to the short response time (SIFS). A spoofer can impersonate and transmit an NDPA or a TF to cause the ISTA to transmit an NDP. These NDP transmissions attributed to spoofed TF or NDPA are equivalent to plaintext attack. According to various embodiments, the LMR frame is protected using PMF and is used to transfer the data (IV, input data and key) for generating the LTF sequence to the ISTA. Since the LMR frame is a protected management frame and a MIC code is transmitted to the ISTA together with the LMR frame, the LMR frame cannot be easily spoofed. Furthermore, compared to the NDPA and the TF which are not encrypted, the LMR frame can include secret information of the LTF sequence since it is encrypted.

Indication of Sounding Signal

For protecting security of ranging measurement, it is desired that the sounding signal is unknown to an attacker or an eavesdropper before or during sounding. It is usually fine that the sounding signal is known by the attacker after the sounding since the attacker cannot make the attack after the sounding is completed. The sounding signal indication (SSI) indicates to a desired receiver of the sounding signal what the sounding signal looks like so that the receiver can estimate a channel using the sounding signal. In one example, the SSI may be an index that indicates a sounding signal in a predefined set of sounding signals. In another example, the SSI may be a sequence of symbols or bits (e.g., a high efficiency (HE)-LTF sequence), which is used to generate the sounding signal. In each measurement, different sounding signals are required for different antennas. In addition, more than one sounding for the same antenna may be implemented for detecting attacks. Each sounding signal may require one SSI. For example, a set of eight SSIs may be needed for one measurement.

If the SSI is sent before the sounding, the SSI should be encrypted so that the attacker cannot know the SSI. Since decryption is time consuming, it is a challenge for a receiver of an SSI to decrypt the SSI and to generate a sounding signal according to the SSI in real time. Thus, it is desired that the SSI is sent early to provide enough decryption time. In previous design, the indication is sent one or two frames before the sounding. This may not be enough for the decryption of the SSI and the generation of the sounding signal for channel estimation or channel sounding. Furthermore, sending the SSI after sounding requires memory to buffer the received sounding signals in addition to the measurement feedback delay.

In some embodiments, instead of per-measurement indication, multiple SSIs for multiple measurements can be exchanged between or among multiple ranging devices in one exchange. The ranging devices can get SSIs for multiple measurements before the measurements. Since each one of SSIs can be used only once in order to prevent replay attacks, the SSIs are used up after a predetermined number of measurements. When the SSIs are used up or run low, the ranging devices can conduct another exchange for getting new SSIs.

In one embodiment, a first ranging device (e.g., an AP) generates an initial group of SSIs respectively for multiple measurements, and transmits the initial group of SSIs to a second ranging device (e.g., a STA) in a negotiation phase before the measurements. Before all of the SSIs in the initial group have been used to generate sounding signals, the first ranging device further generates an additional group of SSIs respectively for a plurality of additional measurements, and transmits the additional group of SSIs to the second ranging device before the additional measurements.

Figure 10:
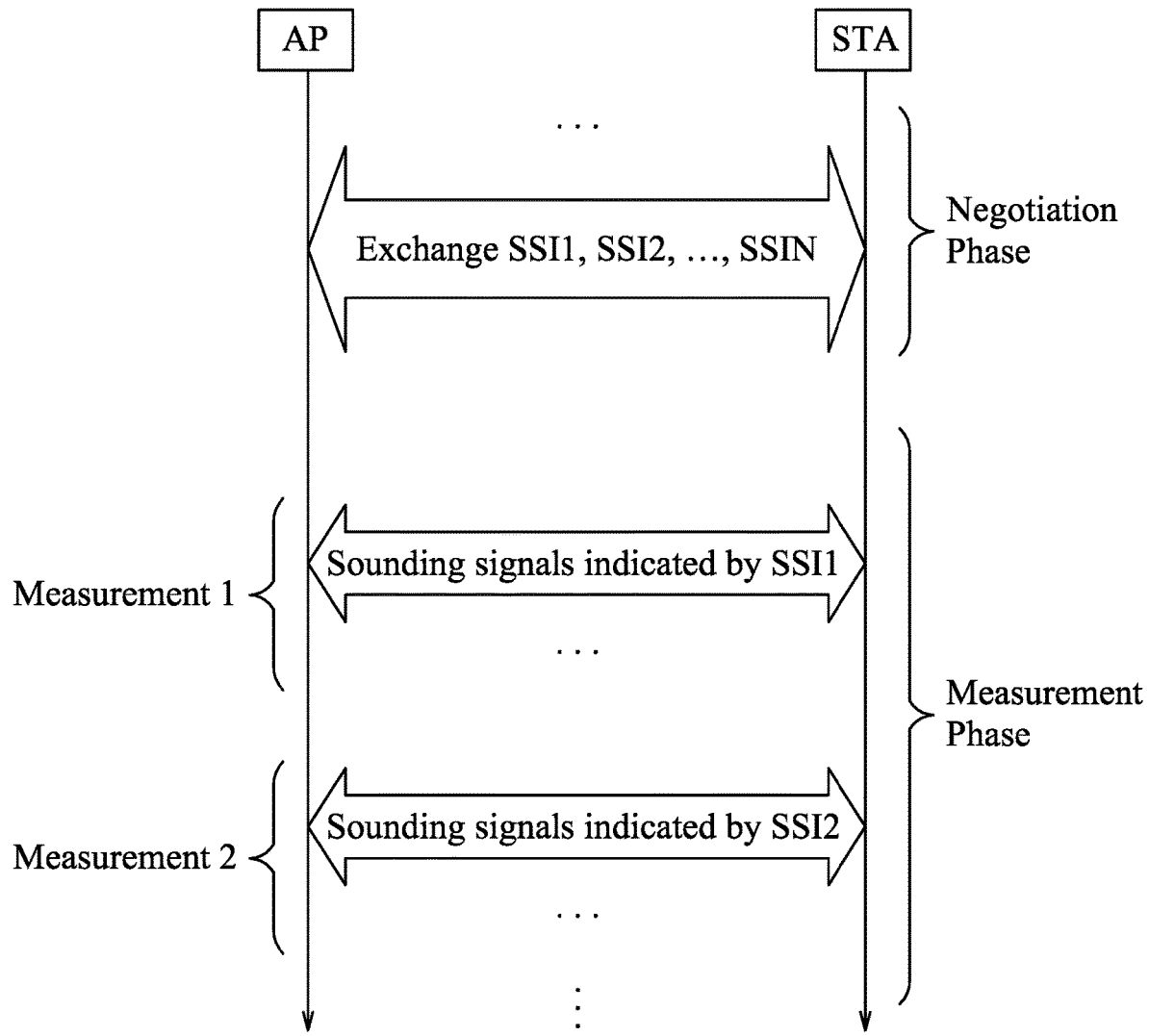
FIG. 10 illustrates a scheme for transmitting a group of sounding signal indications before measurements according to an embodiment.

Referring to FIG. 10, the ranging devices get a first group of SSIs during the negotiation phase. For example, a group of 10 to 100 SSIs may be obtained from one SSI exchange. During the measurement phase, the SSIs may run low and the ranging devices can get additional SSIs via another SSI exchange. The ranging devices may conduct an exchange for the initial group of SSIs during the negotiation phase and get additional 10 to 100 SSIs during the measurement phase.

Figure 11:
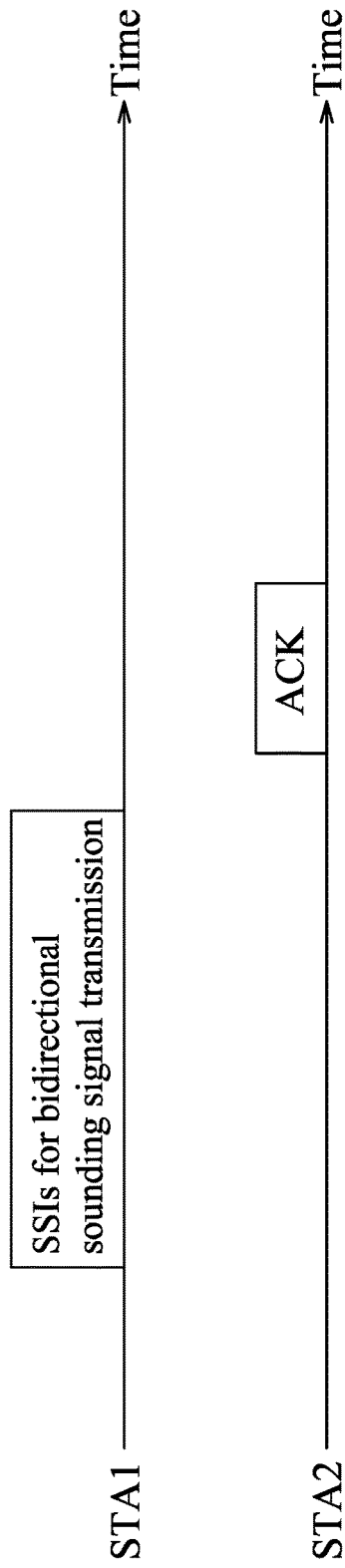
FIG. 11 illustrates an example of transmission of a group of sounding signal indications according to an embodiment.

In one embodiment, the first ranging device configures the SSI to indicate sounding signals for bidirectional sounding signal transmission between the first and second ranging devices for the respective one of the measurements. The SSI exchange is for the ranging devices to get SSIs used in the ranging measurements. In one example as shown in FIG. 11, the SSIs for bidirectional soundings are solely decided by one ranging device (STA1) instead of two ranging devices (STA1, STA2). The measurement ID and SSIs used by the corresponding measurement may be all decided by the ranging device (STA1).

Figure 12:
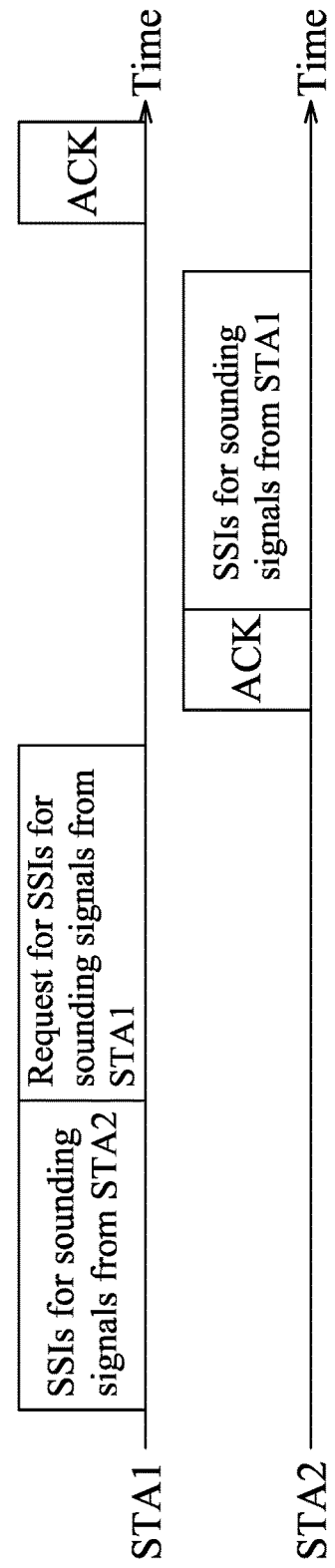
FIG. 12 illustrates another example of transmission of a group of sounding signal indications according to an embodiment.

In one embodiment, the SSIs of the bidirectional soundings may be decided by both parties of the ranging measurement. For each of the SSIs in the initial group, the first ranging device configures the SSI to indicate a sounding signal to be transmitted from one of the first and second ranging devices to the other one of the first and second ranging devices for the respective one of the measurements. The first ranging device further transmits, to the second ranging device in the negotiation phase, a request for a group of SSIs respectively indicating sounding signals to be transmitted from said the other one of the first and second ranging devices to said one of the first and second ranging devices for the measurements, respectively. There are two options. In a first option, each ranging device specifies the SSIs for the other ranging device. In one example as shown in FIG. 12, a first ranging device (STA1) decides the sounding signal to be sent by a second ranging device (STA2) and vice versa. This option requires the receiver of the specified SSIs to decrypt each SSI and to generate the sounding signal timely. However, this option provides authentication of the device sending the sounding signal, because the receiver of the sounding signal can check whether the sounding signal is as specified and the transmitter of the sounding signal can correctly decrypt the SSIs that are encrypted and sent by the receiver of the sounding signal. In a second option, each ranging device only specifies the SSIs for its own sounding signals. For example, the first ranging device (STA1) generates the sounding signals and sends the sounding signals and the corresponding SSIs to the second ranging device (STA2). Since the generation of the sounding signals takes time, this option gives the transmitter of the sounding signals plenty of time to generate the sounding signals before sending the corresponding SSIs to the other ranging device.

Figure 13:
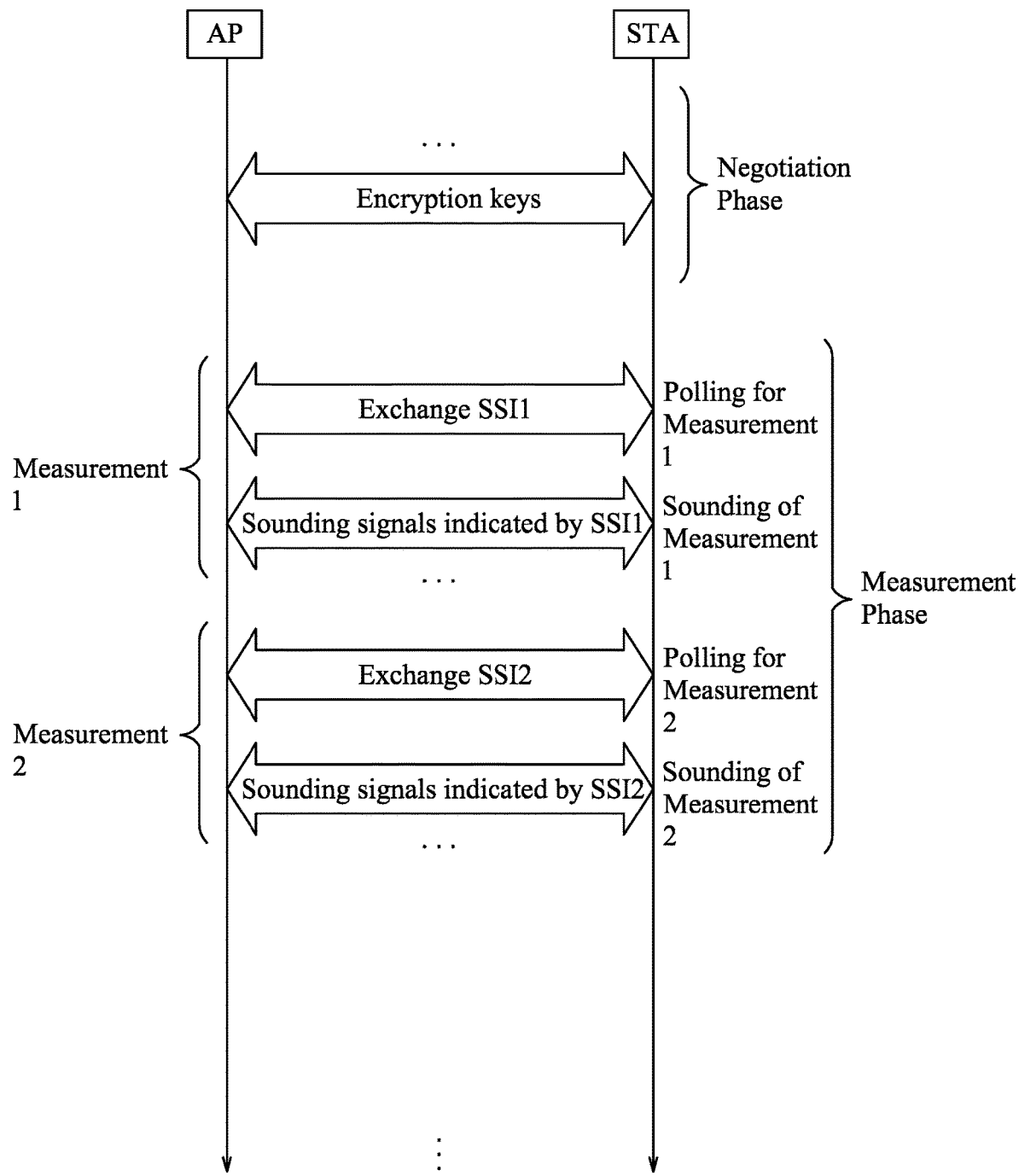
FIG. 13 illustrates a scheme for transmitting sounding signal indications measurement by measurement according to an embodiment.
Figure 14:
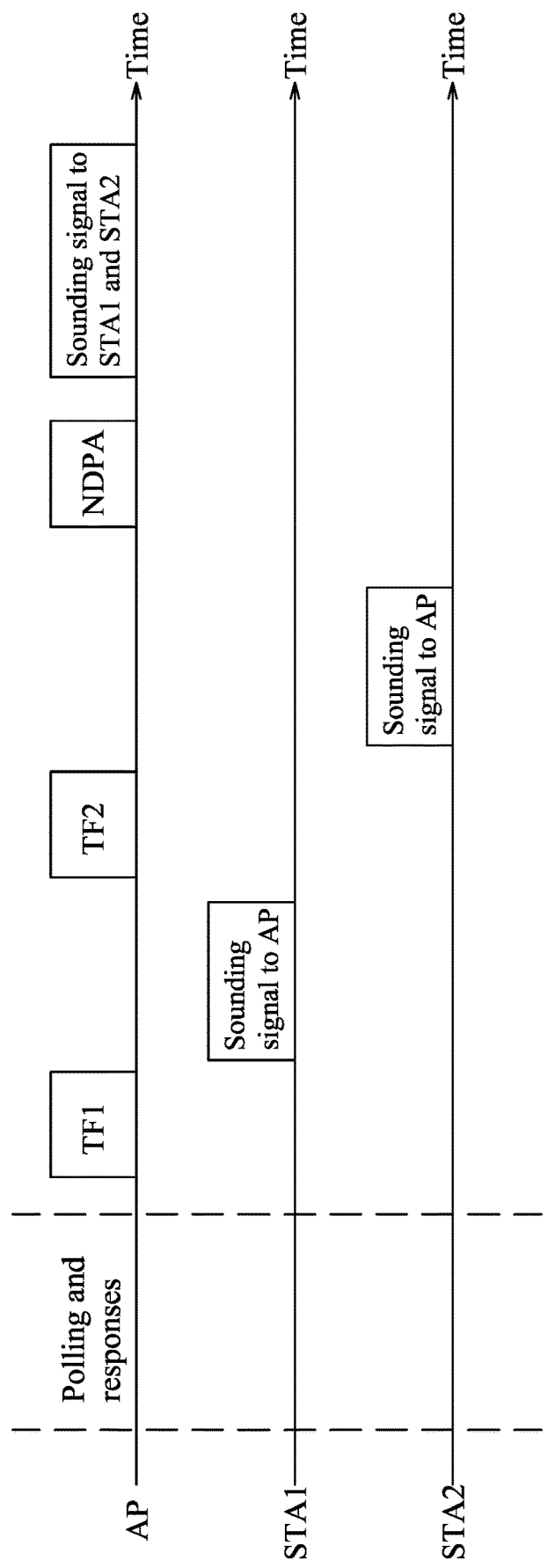
FIG. 14 illustrates a polling phase before sounding in a measurement sequence for multi-user ranging protocol.

In the above-mentioned scheme, grouped assignments of SSIs sent before multiple measurements are described with reference to FIGS. 10 to 12. In an alternative scheme, a first ranging device generates an SSI for a measurement, and transmits the SSI to a second ranging device in one of a polling phase and a trigger frame before the measurement. The SSIs for each measurement may be assigned measurement by measurement as illustrated in FIG. 13. For example, the SSIs for the current measurement may be assigned before the sounding of the current measurement, or may be assigned in the previous measurement, e.g., aggregated with the previous LMR frame to get more processing time. There is a polling phase before the sounding in the measurement sequence for the MU ranging protocol as illustrated in FIG. 14. For the SU ranging protocol, the polling phase is not mandatory and may be added as an option.

In the polling phase, one ranging device sends a polling frame to the other ranging device(s), and the SSI can be added to the polling frame and/or the response frame. Referring to FIG. 14 for the multiuser ranging, there are two options for downlink sounding from an AP to STAs. In a first option, the AP sends separate sets of encrypted sounding signals to a first ranging device (STA1) and a second ranging device (STA2), respectively. The SSIs of the sets of sounding signals are sent before the soundings, for example, in the polling phase or in the individual trigger frames (TFs). In a second option, the AP sends one set of encrypted sounding signals to all STAs (STA1, STA2). The SSIs of the set of sounding signals are sent after the sounding, for example, in a frame right after the downlink sounding. This reduces the overhead in the downlink sounding at the cost of buffering the received downlink sounding signals. For uplink soundings in the multiuser ranging, the SSI for uplink soundings from the STAs to the AP can be sent in the polling phase or in the trigger frames.

Figure 15:
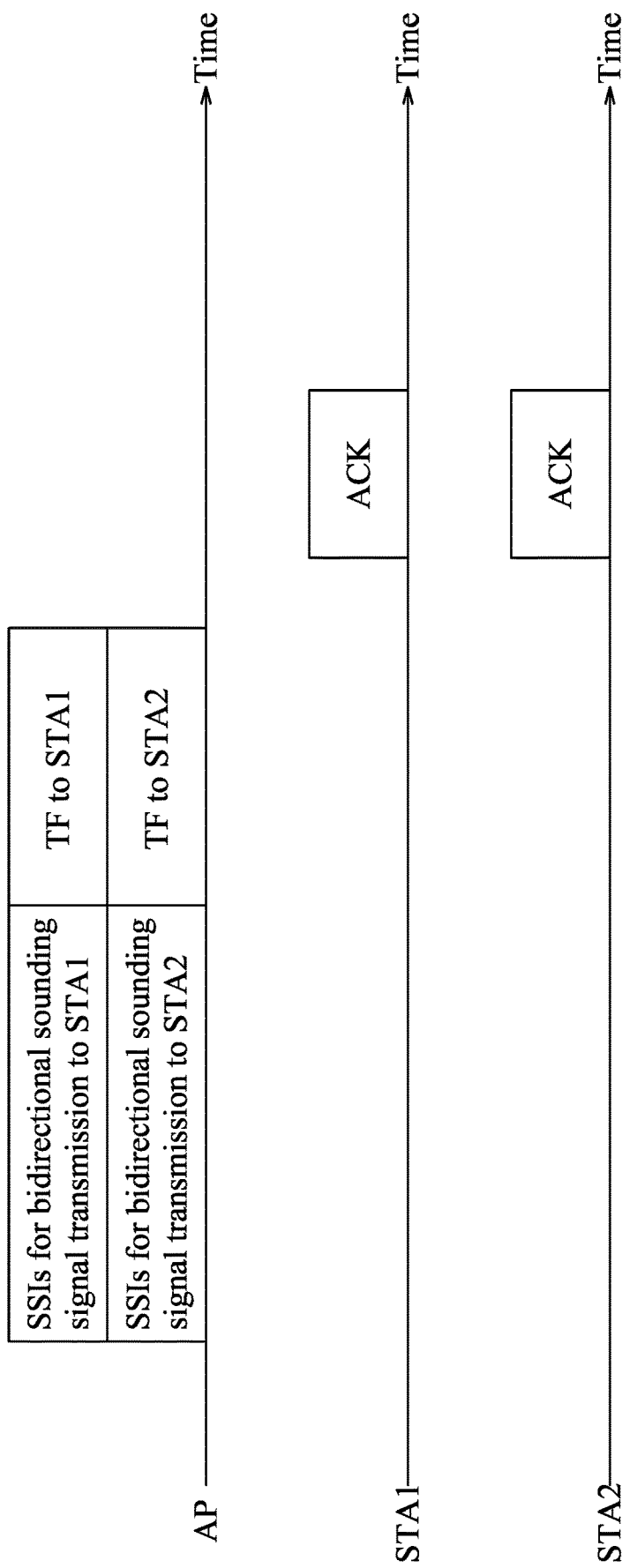
FIG. 15 illustrates an example of transmission of sounding signal indications for bidirectional sounding according to an embodiment.
Figure 16:
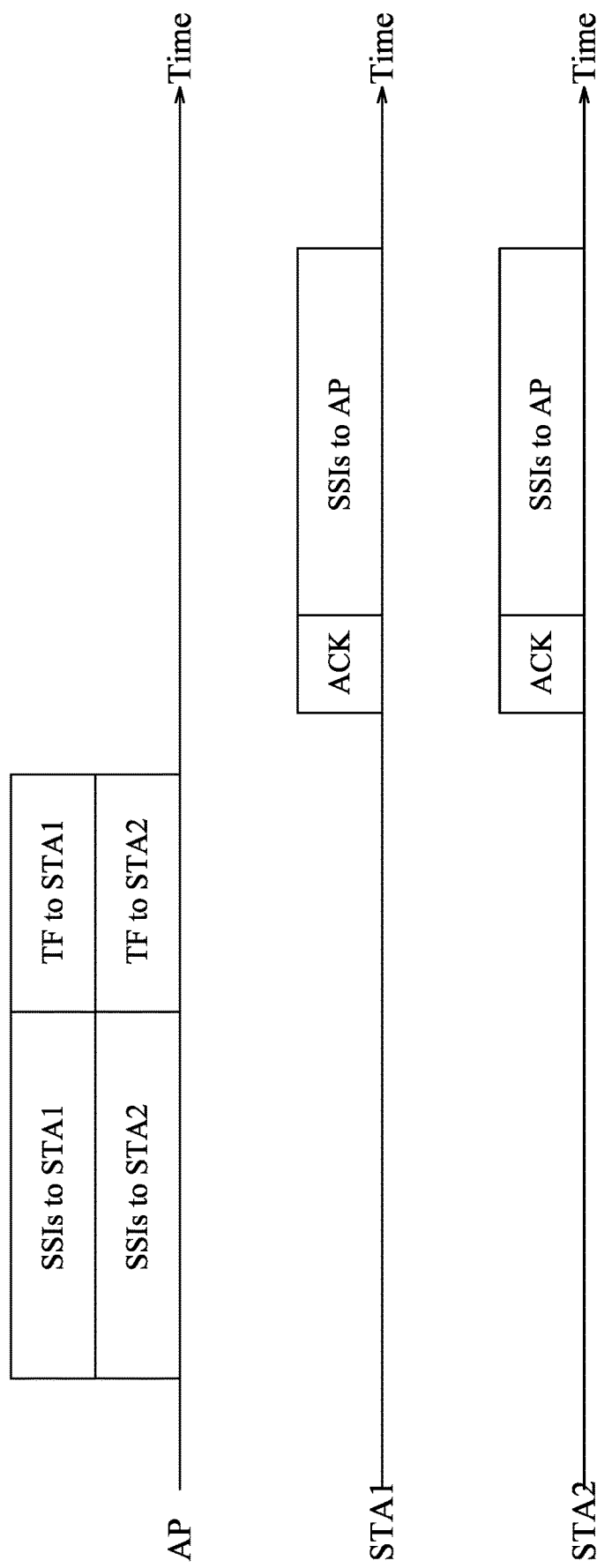
FIG. 16 illustrates an example of transmission of sounding signal indications for unidirectional sounding according to an embodiment.

Referring to FIG. 15, the SSIs for the bidirectional sounding are assigned by one ranging device (e.g., the AP). For example, the AP sends the SSIs to the STAs (STA1, STA2), and solicits acknowledgements (ACKs) therefrom. The trigger frame (TF) allocates transmission resource for the ACKs. If the ACK is received from an STA, the AP knows that the STA is ready for the ranging measurement and already received the SSIs successfully. Referring to FIG. 16, for each link between the AP and one of the STAs (STA1, STA2), the SSIs for the bidirectional sounding are assigned by two ranging devices. One ranging device only assigns the SSIs for one direction of the bidirectional soundings. As aforementioned, the ranging device can assign the SSIs for the sounding signals to be sent by itself or the SSIs for the sounding signals received by itself. An additional ACK may be added for the AP to acknowledge the reception of the SSIs sent by the STAs (STA1, STA2).

Independent from the SSI, the polling phase can help power control. The indication of power headroom can be added to the response frame and/or the polling frame. The power headroom indicates to the receiver how much more power the transmitter can send out. For example, in the MU ranging protocol, the AP specifies a target of received signal strength indication (RSSI) in the polling frame. The STA responds to the polling by a response. In the response, the STA specifies the power headroom thereof so that the AP knows whether the STA can meet the target and how far the power of the STA is away from the target. After the AP knows the power headroom of the STA, the AP can group the STAs that can achieve roughly the same RSSI together, for example, for scheduling P-matrix multiplexed, multiuser NDP soundings. In addition, the target of the RSSI in a following trigger frame can be tuned according to the indication of power headroom received from the polling response.

For exchanging the SSI, a table may be used as illustrated in Table 1. The table may be used for exchanging one or multiple sets of SSIs for one or multiple measurements. Each set of SSIs is used by one measurement and is indexed by a measurement ID such as a sounding token. For assigning SSIs for bidirectional soundings, there are two options.

In a first option, each set of SSIs shares one measurement ID and has two subsets each for one sounding direction of the bidirectional soundings. For example, twelve SSIs are associated with one measurement ID. The first to eighth SSIs are for the soundings from an AP (with 4 transmit antennas) to an STA, and the last four SSIs are for the soundings from the STA (with 2 transmit antennas) to the AP. The number of SSIs for each direction of the soundings may be configured during the negotiation phase, or an additional indication bit (subset) is used to indicate the sounding direction of the SSI. In a second option, one bidirectional sounding is split into two unidirectional soundings. Each unidirectional sounding is indexed by a measurement ID such as a sounding token. Each ranging device of the bidirectional sounding assigns the measurement ID and the corresponding SSIs only for one of the two unidirectional soundings in the bidirectional sounding as illustrated in FIGS. 12 and 16. Since the decryption of the measurement IDs takes time, using the measurement ID specified by the other ranging device for specifying the SSIs of the reverse direction increases implementation complexities. Therefore, independent assignment of measurement IDs between two ranging devices reduces the implementation complexities.

TABLE 1

| Measurement ID | SSI 1 | SSI 2 | ... | SSI N |
|---|---|---|---|---|
| 1 | $S_{1,1}$ | $S_{1,2}$ | ... | $S_{1,N}$ |
| 2 | $S_{2,1}$ | $S_{2,2}$ | ... | $S_{2,N}$ |
| . | . | . |  | . |
| . | . | . |  | . |
| . | . | . |  | . |
| M | $S_{M,1}$ | $S_{M,2}$ | ... | $S_{M,N}$ |

Figure 17:
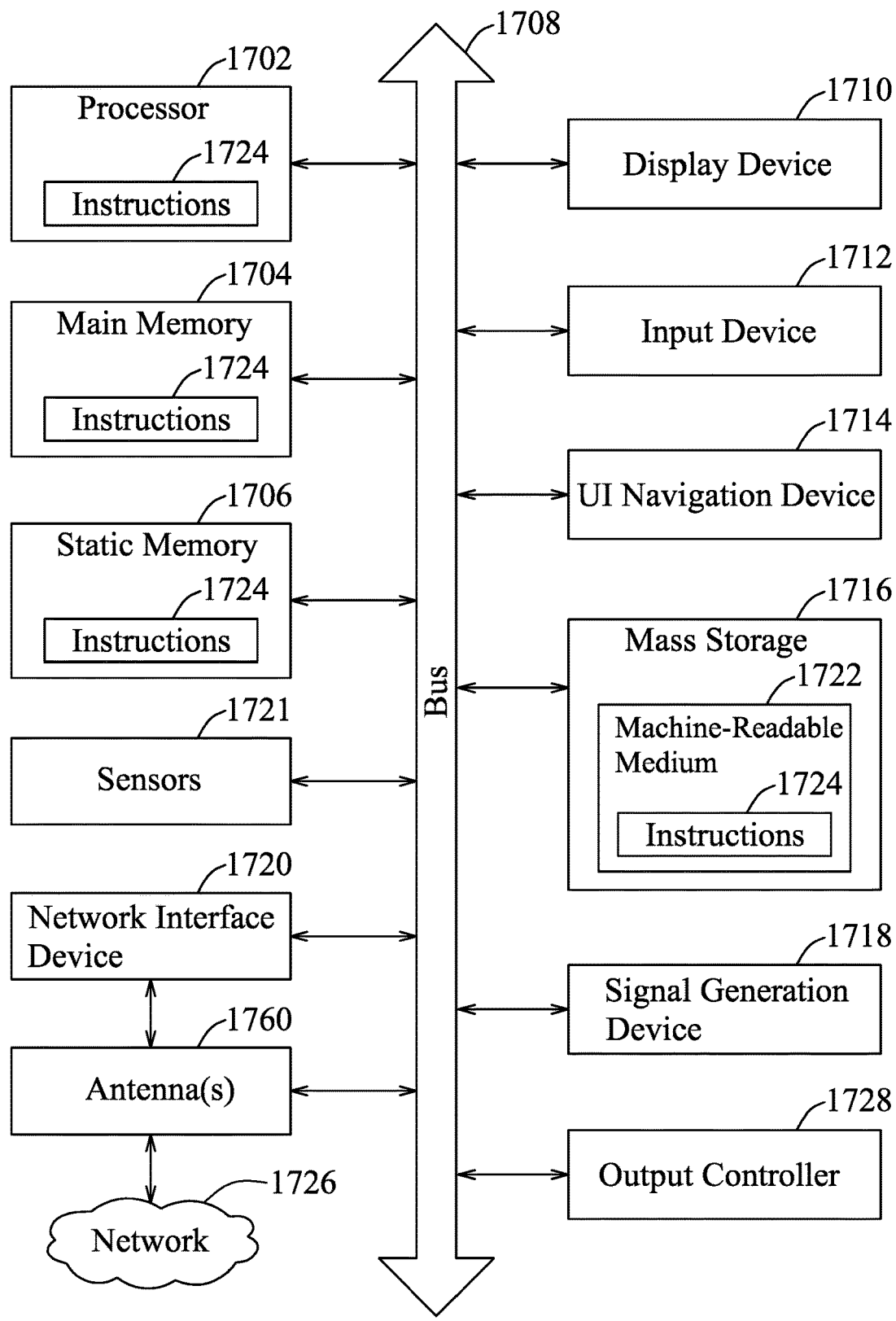
FIG. 17 illustrates a block diagram of an example machine upon which any one or more of techniques discussed herein may perform.

FIG. 17 illustrates a block diagram of an example machine 1700 upon which any one or more of methods and/or operations discussed herein may perform. The machine 1700 may operate as a standalone device or may be connected (e.g., networked) to other machines. In a network environment, the machine 1700 may operate as a server machine, a client machine, or both in server-client network environments. In an example, the machine 1700 may act as a peer machine in peer-to-peer (P2P) network environment. The machine 1700 may be a high-efficiency (HE) AP, a HE station, a personal computer (PC), a tablet PC, a set-top box (STB), a personal digital assistant (PDA), a portable communications device, a mobile telephone, a smart phone, a web appliance, a network router, a switch or bridge, or any machine capable of executing instructions.

The machine 1700 includes a hardware processor 1702 (e.g., a central processing unit (CPU), a graphics processing unit (GPU), a hardware processor core, or any combination thereof), a main memory 1704 and a static memory 1706, some or all of which may communicate with each other via a bus 1708.

Some specific examples of the main memory 1704 include random access memory (RAM), and semiconductor memory devices, which may include, in some embodiments, storage locations in semiconductors such as registers. Some specific examples of the static memory 1706 include nonvolatile memory (e.g., electrically programmable read-only memory (EPROM), electrically erasable programmable read-only memory (EEPROM)), flash memory devices, magnetic disks (e.g., such as internal hard disks and removable disks), magneto-optical disks, and RAM.

The machine 1700 further includes a display device 1710, an input device 1712 (e.g., a keyboard), and a user interface (UI) navigation device 1714 (e.g., a mouse). In an example, the display device 1710, input device 1712 and UI navigation device 1714 may be integrated as a touch screen display. The machine 1700 may additionally include a mass storage 1716 (e.g., drive unit), a signal generation device 1718 (e.g., a speaker), a network interface device 1720, and one or more sensors 1721, such as a global positioning system (GPS) sensor, compass, accelerometer, or other sensors. The machine 1700 may further include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage 1716 may include a machine-readable medium 1722 that stores one or more sets of data structures or instructions 1724 (e.g., software) embodying or utilized by any one or more of the techniques or functions described herein. The instructions 1724 may also reside, completely or at least partially, within the main memory 1704, within the static memory 1706, or within the hardware processor 1702 during execution thereof by the machine 1700. In an example, one or any combination of the hardware processor 1702, the main memory 1704, the static memory 1706 or the mass storage 1716 may constitute machine-readable media.

Specific examples of machine-readable media may include: nonvolatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks. While the machine-readable medium 1722 is illustrated as a single medium, the term "machine-readable medium" may include a single medium or multiple media (e.g., a centralized or distributed database, and/or associated caches and servers) configured to store the one or more instructions 1724.

An apparatus of the machine 1700 may be one or more of the hardware processor 1702 (e.g., a central processing unit (CPU), a graphics processing unit (GPU), a hardware processor core, or any combination thereof), the main memory 1704 and the static memory 1706, the sensors 1721, the network interface device 1720, the display device 1710, the input device 1712, the UI navigation device 1714, the mass storage 1716, the instructions 1724, the signal generation device 1718, the output controller 1728, and antennas. The apparatus may be configured to perform one or more of the methods and/or operations disclosed herein. The apparatus may be intended as a component of the machine 1700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware, The instructions 1724 may further be transmitted or received over a communication network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Examples of the communication network 1726 may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1720 may include one or more physical jacks (e.g., Ethernet, coaxial, or phone jacks) or one or more antennas to connect to the communication network 1726. In an example, the network interface device 1720 may include one or more antennas 1760 to wirelessly communicate using at least one of single-input multiple-output (SIMO), multiple-input multiple-output (MIMO), or multiple-input single-output (MISO) techniques. In some examples, the network interface device 1720 may wirelessly communicate using MU MIMO techniques. The term "transmission medium" shall be taken to include any intangible medium that is capable of storing, encoding or carrying instructions for execution by the machine 1700, and includes digital or analog communications signals or other intangible medium to facilitate communication of such software.

Examples as described herein may include or may operate on logic or a number of components, modules, or mechanisms. Modules are tangible entities (e.g., hardware) capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity that is physically constructed, specifically configured (e.g., hardwired), or temporarily (e.g., transitorily) configured (e.g., programmed) to operate in a specified manner or to perform part or all of any operations described herein. Considering examples in which modules are temporarily configured, each of the modules need not be instantiated at any one moment in time. For example, where the modules include a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM), random access memory (RAM), magnetic disk storage media, optical storage media, flash memory, etc.

Figure 18:
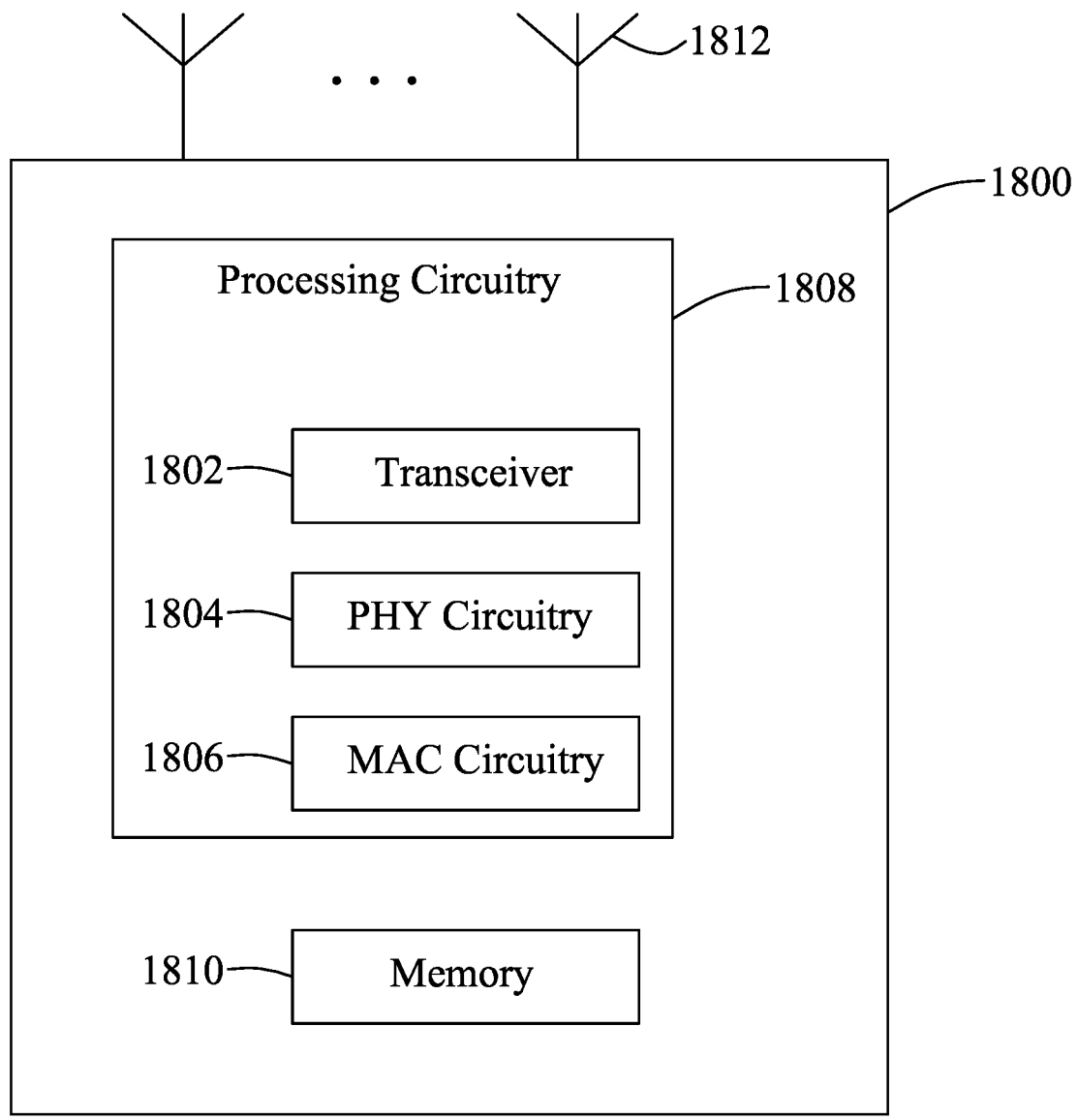
FIG. 18 illustrates a block diagram of an example wireless device upon which any one or more of techniques discussed herein may perform.

FIG. 18 illustrates a block diagram of an example wireless device 1800 upon which any one or more of the techniques (e.g., methodologies or operations) discussed herein may perform. The wireless device 1800 may be an HE device, such as an HE STA or an HE AP. The wireless device 1800 may be an example of the machine 1700 as disclosed in conjunction with FIG. 17.

The wireless device 1800 includes processing circuitry 1808. The processing circuitry 1808 includes a transceiver 1802, physical layer circuitry (PHY circuitry) 1804, and MAC layer circuitry (MAC circuitry) 1806, one or more of which may enable transmission and reception of signals to and from other wireless devices using one or more antennas 1812. As an example, the PHY circuitry 1804 may perform various encoding and decoding functions including formation of baseband signals for transmission and decoding of received signals. As another example, the transceiver 1802 may perform various transmission and reception functions such as conversion of signals between a baseband range and a Radio Frequency (RF) range.

Accordingly, the PHY circuitry 1804 and the transceiver 1802 may be separate components or may be part of a combined component, e.g., the processing circuitry 1808. In addition, some of the described functionality related to transmission and reception of signals may be performed by a combination including one, any or all of the PHY circuitry 1804, the transceiver 1802, the MAC circuitry 1806, and other components or layers. The MAC circuitry 1806 may control access to the wireless medium. The wireless device 1800 may further include a memory 1810 arranged to perform the operations described herein. For example, some of the operations described herein may be performed by instructions stored in the memory 1810.

The antennas 1812 (some embodiments may include only one antenna) may include one or more directional or omni-directional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1812 may be effectively separated to take advantage of spatial diversity and the different channel characteristics.

One or more of the memory 1810, the transceiver 1802, the PHY circuitry 1804, the MAC circuitry 1806, the antennas 1812 and/or the processing circuitry 1808 may be coupled with one another. Moreover, although the memory 1810, the transceiver 1802, the PHY circuitry 1804, the MAC circuitry 1806 and the antennas 1812 are illustrated as separate components, one or more of the memory 1810, the transceiver 1802, the PHY circuitry 1804, the MAC circuitry 1806 and the antennas 1812 may be integrated in an electronic package or chip.

In some embodiments, the wireless device 1800 may be a mobile device as described in conjunction with FIG. 17. In some embodiments, the wireless device 1800 may be configured to operate in accordance with one or more wireless communication standards as described herein (e.g., IEEE 802.11). In some embodiments, the wireless device 1800 may include one or more of the components as described in conjunction with FIG. 17 (e.g., the display device 1710, the input device 1712, etc.). Although the wireless device 1800 is illustrated as having several separate functional elements, one or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the MAC circuitry 1806 may be arranged to contend for a wireless medium during a contention period to receive control of the medium for an HE transmission opportunity (TXOP) and to encode or decode a physical Layer Convergence Procedure (PLCP) Protocol Data Unit (PPDU). In some embodiments, the MAC circuitry 1806 may be arranged to contend for the wireless medium based on channel contention settings, a transmitting power level, and a clear channel assessment level (e.g., an energy detect level).

The PHY circuitry 1804 may be arranged to transmit signals in accordance with one or more communication standards described herein. For example, the PHY circuitry 1804 may be configured to transmit an HE PPDU. The PHY circuitry 1804 may include circuitry for modulation/demodulation, up-conversion/down-conversion, filtering, amplification, etc.

In some embodiments, the processing circuitry 1808 may include one or more processors. The processing circuitry 1808 may be configured to perform functions based on instructions being stored in a RAM or ROM, or based on special purpose circuitry. The processing circuitry 1808 may include a processor such as a general purpose processor or special purpose processor. The processing circuitry 1808 may implement one or more functions associated with the antennas 1812, the transceiver 1802, the PHY circuitry 1804, the MAC circuitry 1806, and/or the memory 1810. In some embodiments, the processing circuitry 1808 may be configured to perform one or more of the functions/operations and/or methods described herein.

Figure 19:
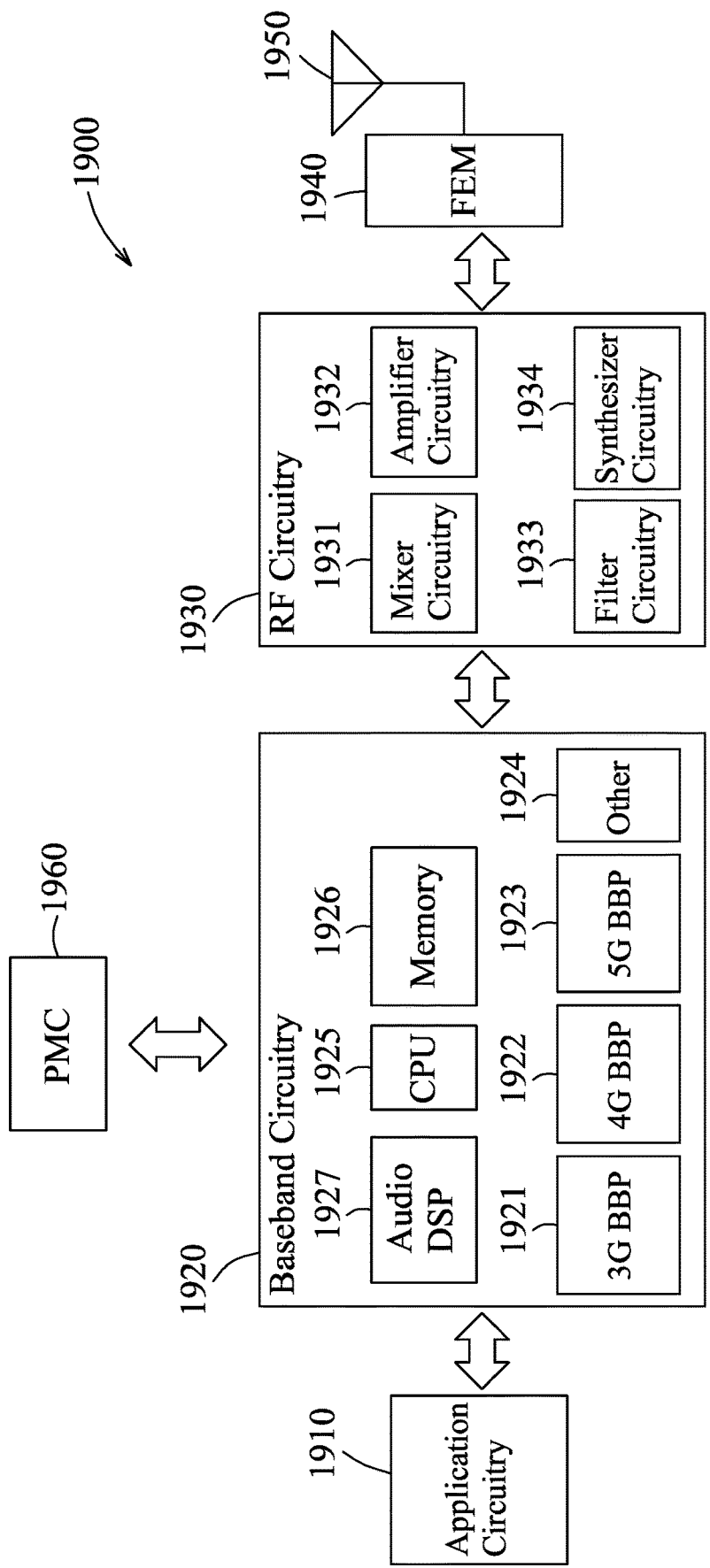
FIG. 19 is a schematic block diagram illustrating an apparatus for securing long training field sequences according to some embodiments of this disclosure.

FIG. 19 illustrates an example of an apparatus 1900 operable for securing LTF sequences according to some embodiments of this disclosure. For example, the apparatus 1900 may be included in a user equipment (UE) or a radio access network (RAN) node. In this embodiment, the apparatus 1900 includes application circuitry 1910, baseband circuitry 1920, radio frequency (RF) circuitry 1930, front-end module (FEM) circuitry 1940, one or more antennas 1950 (only one is depicted) and power management circuitry (PMC) 1960. In some embodiments, the apparatus 1900 may include fewer components. For example, a RAN node may not include the application circuitry 1910, and instead include a processor/controller to process Internet-Protocol (IP) data received from an evolved packet core (EPC) network. In other embodiments, the apparatus 1900 may include additional components, for example, a memory/storage device, a display, a camera, a sensor or an input/output (I/O) interface. In some embodiments, the above-mentioned components may be included in more than one device. For example, in order to implement a Cloud-RAN architecture, the above-mentioned circuitries may be separated and included in two or more devices in the Cloud-RAN architecture.

The application circuitry 1910 may include one or more application processors. For example, the application circuitry 1910 may include, but is not limited to, one or more single-core or multi-core processors. The processors may include any combination of general-purpose processors and dedicated processors (e.g., graphics processors, application processors, etc.). The processors may be coupled to or include a memory/storage module, and may be configured to execute instructions stored in the memory/storage module to enable various applications or operating systems to run on the apparatus 1900. In some embodiments, the processors of the application circuitry 1910 may process IP data packets received from an EPC network.

In some embodiments, the baseband circuitry 1920 may provide for communication compatible with one or more radio technologies. For example, in some embodiments, the baseband circuitry 1920 may support communication with an evolved universal terrestrial radio access network (EUTRAN) or other wireless metropolitan area networks (WMAN), a wireless local area network (WLAN), or a wireless personal area network (WPAN). In some embodiments where the baseband circuitry 1920 is configured to support radio communication using more than one wireless protocol, the baseband circuitry 1920 may be referred to as a multi-mode baseband circuitry.

The baseband circuitry 1920 may include, but is not limited to, one or more single-core or multi-core processors. The baseband circuitry 1920 may include one or more baseband processors or control logic to process baseband signals received from the RF circuitry 1930, and to generate baseband signals to be transmitted to the RF circuitry 1930. The baseband circuitry 1920 may interface and communicate with the application circuitry 1910 for generation and processing of the baseband signals and for controlling operations of the RF circuitry 1930.

In some embodiments, the baseband circuitry 1920 may include a third generation (3G) baseband processor (3G BBP) 1921, a fourth generation (4G) baseband processor (4G BBP) 1922, a fifth generation (5G) baseband processor (5G BBP) 1923 and other baseband processor(s) 1924 for other existing generations, generations in development or to be developed in the future (e.g., second generation (2G), sixth generation (6G), etc.). The baseband processors 1921-1924 of the baseband circuitry 1920 are configured to handle various radio control functions that enable communication with one or more radio networks via the RF circuitry 1930. In other embodiments, the baseband circuitry 1920 may further include a central processing unit (CPU) 1925 and a memory 1926, and some or all functionality (e.g., the radio control functions) of the baseband processors 1921-1924 may be implemented as software modules that are stored in the memory 1926 and executed by the CPU 1925 to carry out the functionality. The radio control functions of the baseband processors 1921-1924 may include, but are not limited to, signal modulation/demodulation, encoding/decoding, radio frequency shifting, etc. In some embodiments, the signal modulation/demodulation includes Fast-Fourier Transform (FFT), pre-coding or constellation mapping/demapping. In some embodiments, the encoding/decoding includes convolution, tail-biting convolution, turbo, Viterbi, or Low Density Parity Check (LDPC) encoding/decoding. Embodiments of the signal modulation/demodulation and the encoding/decoding are not limited to these examples and may include other suitable operations in other embodiments. In some embodiments, the baseband circuitry 1920 may further include an audio digital signal processor (DSP) 1927 for compression/decompression and echo cancellation.

In some embodiments, the components of the baseband circuitry 1920 may be integrated as a single chip or a single chipset, or may be disposed on a single circuit board. In some embodiments, some or all of the constituent components of the baseband circuitry 1920 and the application circuitry 1910 may be integrated as, for example, a system on chip (SoC).

The RF circuitry 1930 is configured to enable communication with wireless networks using modulated electromagnetic radiation through a non-solid medium. In various embodiments, the RF circuitry 1930 may include switches, filters, amplifiers, etc., to facilitate communication with the wireless network. The RF circuitry 1930 may include a receive signal path that includes circuitry to down-convert RF signals received from the FEM circuitry 1940 and to provide the baseband signals to the baseband circuitry 1920. The RF circuitry 1930 may further include a transmit signal path that includes circuitry to up-convert the baseband signals provided by the baseband circuitry 1920 and to provide RF output signals to the FEM circuitry 1940 for transmission.

In some embodiments, the receive signal path of the RF circuitry 1930 may include mixer circuitry 1931, amplifier circuitry 1932 and filter circuitry 1933. In some embodiments, the transmit signal path of the RF circuitry 1930 may include filter circuitry 1933 and mixer circuitry 1931. The RF circuitry 1930 may also include synthesizer circuitry 1934 for synthesizing a frequency for use by the mixer circuitry 1931 of the receive signal path and/or the transmit signal path.

For the receive signal path, in some embodiments, the mixer circuitry 1931 may be configured to down-convert RF signals received from the FEM circuitry 1940 based on the synthesized frequency provided by synthesizer circuitry 1934. The amplifier circuitry 1932 may be configured to amplify the down-converted signals. The filter circuitry 1933 may be a low-pass filter (LPF) or a band-pass filter (BPF) configured to remove unwanted signals from the down-converted signals to generate output baseband signals. The output baseband signals may be provided to the baseband circuitry 1920 for further processing. In some embodiments, the output baseband signals may be zero-frequency baseband signals, although this is not a requirement. In some embodiments, the mixer circuitry 1931 of the receive signal path may include passive mixers, although the scope of the embodiments is not limited in this respect.

As for the transmit signal path, in some embodiments, the mixer circuitry 1931 may be configured to up-convert input baseband signals based on the synthesized frequency provided by the synthesizer circuitry 1934 to generate the RF output signals for the FEM circuitry 1940. The input baseband signals may be provided by the baseband circuitry 1920, and may be filtered by the filter circuitry 1933.

In some embodiments, the mixer circuitry 1931 of the receive signal path and the mixer circuitry 1931 of the transmit signal path may include two or more mixers and may be arranged for quadrature down-conversion in the receive signal path and for quadrature up-conversion in the transmit signal path. In some embodiments, the mixer circuitry 1931 of the receive signal path and the mixer circuitry 1931 of the transmit signal path may include two or more mixers and may be arranged for image rejection (e.g., Hartley image rejection). In some embodiments, the mixer circuitry 1931 of the receive signal path and the mixer circuitry 1931 of the transmit signal path may be arranged for direct down-conversion and direct up-conversion, respectively. In some embodiments, the mixer circuitry 1931 of the receive signal path and the mixer circuitry 1931 of the transmit signal path may be configured for super-heterodyne operation.

In some embodiments, the output baseband signals and the input baseband signals may be analog baseband signals, although the scope of the embodiments is not limited in this respect. In alternative embodiments, the output baseband signals and the input baseband signals may be digital baseband signals. In such alternative embodiments, the RF circuitry 1930 may further include analog-to-digital converter (ADC) circuitry and digital-to-analog converter (DAC) circuitry, and the baseband circuitry 1920 may include a digital baseband interface to communicate with the RF circuitry 1930.

In some dual-mode embodiments, a separate radio IC circuitry may be provided for processing signals for each spectrum, although the scope of the embodiments is not limited in this respect.

In some embodiments, the synthesizer circuitry 1934 may be a fractional-N synthesizer or a fractional N/N+1 synthesizer, although the scope of the embodiments is not limited in this respect as other types of frequency synthesizers may be suitable. For example, the synthesizer circuitry 1934 may be a delta-sigma synthesizer, a frequency multiplier, or a synthesizer comprising a phase-locked loop with a frequency divider in other embodiments.

The synthesizer circuitry 1934 may be configured to synthesize an output frequency for use by the mixer circuitry 1931 of the RF circuitry 1930 based on a frequency input and a divider control input. In some embodiments, the frequency input may be provided by a voltage controlled oscillator (VCO), although that is not a requirement. In some embodiments, the divider control input may be provided by either the baseband circuitry 1920 or the application circuitry 1910 depending on the desired output frequency. In some embodiments, the divider control input (e.g., N) may be determined according to a look-up table based on a channel indicated by the application circuitry 1910.

The synthesizer circuitry 1934 of the RF circuitry 1930 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide an input signal by either N or N+1 (e.g., based on a carry out) to provide a fractional division ratio. In some embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is a number of the delay elements in the delay line. In this way, the DLL provides negative feedback to help ensure that the total delay through the delay line is one VCO cycle.

In some embodiments, the synthesizer circuitry 1934 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1930 may include an IQ/polar converter.

The FEM circuitry 1940 may include a receive signal path that includes circuitry configured to operate on RF signals received from the one or more antennas 1950, to amplify the received RF signals and to provide amplified versions of the received RF signals to the RF circuitry 1930 for further processing. The FEM circuitry 1940 may further include a transmit signal path that includes circuitry configured to amplify signals provided by the RF circuitry 1930 for transmission by one or more of the one or more antennas 1950. In various embodiments, the amplification through the transmit or receive signal path may be done solely in the RF circuitry 1930, solely in the FEM circuitry 1940, or in both the RF circuitry 1930 and the FEM circuitry 1940.

In some embodiments, the FEM circuitry 1940 may include a TX/RX switch to switch between transmit mode operation and receive mode operation. The receive signal path of the FEM circuitry 1940 may include a low-noise amplifier (LNA) to amplify the received RF signals and to provide the amplified versions of the received RF signals as an output (e.g., to the RF circuitry 1930). The transmit signal path of the FEM circuitry 1940 may include a power amplifier (PA) to amplify input RF signals (e.g., provided by the RF circuitry 1930), and one or more filters to generate RF signals for subsequent transmission (e.g., by one or more of the one or more antennas 1950).

In some embodiments, the PMC 1960 is configured to manage power provided to the baseband circuitry 1920. In particular, the PMC 1960 may control power-source selection, voltage scaling, battery charging, or DC-to-DC conversion. The PMC 1960 may often be included in the apparatus 1900 when the apparatus 1900 is capable of being powered by a battery. For example, when the apparatus 1900 is included in a UE, it generally includes the PMC 1960. The PMC 1960 may increase the power conversion efficiency while providing desirable implementation size and heat dissipation characteristics.

While FIG. 19 shows the PMC 1960 being coupled only with the baseband circuitry 1920, in other embodiments, the PMC 1960 may be additionally or alternatively coupled with, and perform similar power management operations for, other components such as, but not limited to, the application circuitry 1910, the RF circuitry 1930 or the FEM 1940.

In some embodiments, the PMC 1960 may control, or otherwise be part of, various power saving mechanisms of the apparatus 1900. For example, if the apparatus 1900 is in an RRC_Connected state, where it is still connected to the RAN node as it expects to receive traffic shortly, then it may enter a state known as Discontinuous Reception Mode (DRX) after a period of inactivity. During this state, the apparatus 1900 may power down for brief intervals of time and thus save power.

If there is no data traffic activity for an extended period of time, then the apparatus 1900 may enter an RRC_Idle state, where it disconnects from network and does not perform operations such as channel quality feedback, handover, etc. The apparatus 1900 goes into a very low power state and it performs paging where it periodically wakes up to listen to the network and then powers down again. The apparatus 1900 may not receive data in this state. In order to receive data, the apparatus 1900 must transition back to the RRC_Connected state.

An additional power saving mode may allow a device or apparatus to be unavailable to the network for periods longer than a paging interval (ranging from seconds to a few hours). During this time, the device or apparatus is totally unreachable to the network and may power down completely. Any data sent during this time incurs a large delay and it is assumed the delay is acceptable.

Processors of the application circuitry 1910 and processors of the baseband circuitry 1920 may be used to execute elements of one or more instances of a protocol stack. For example, processors of the baseband circuitry 1920, alone or in combination, may be used to execute Layer 3, Layer 2, or Layer 1 functionality, while processors of the application circuitry 1910 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 20:
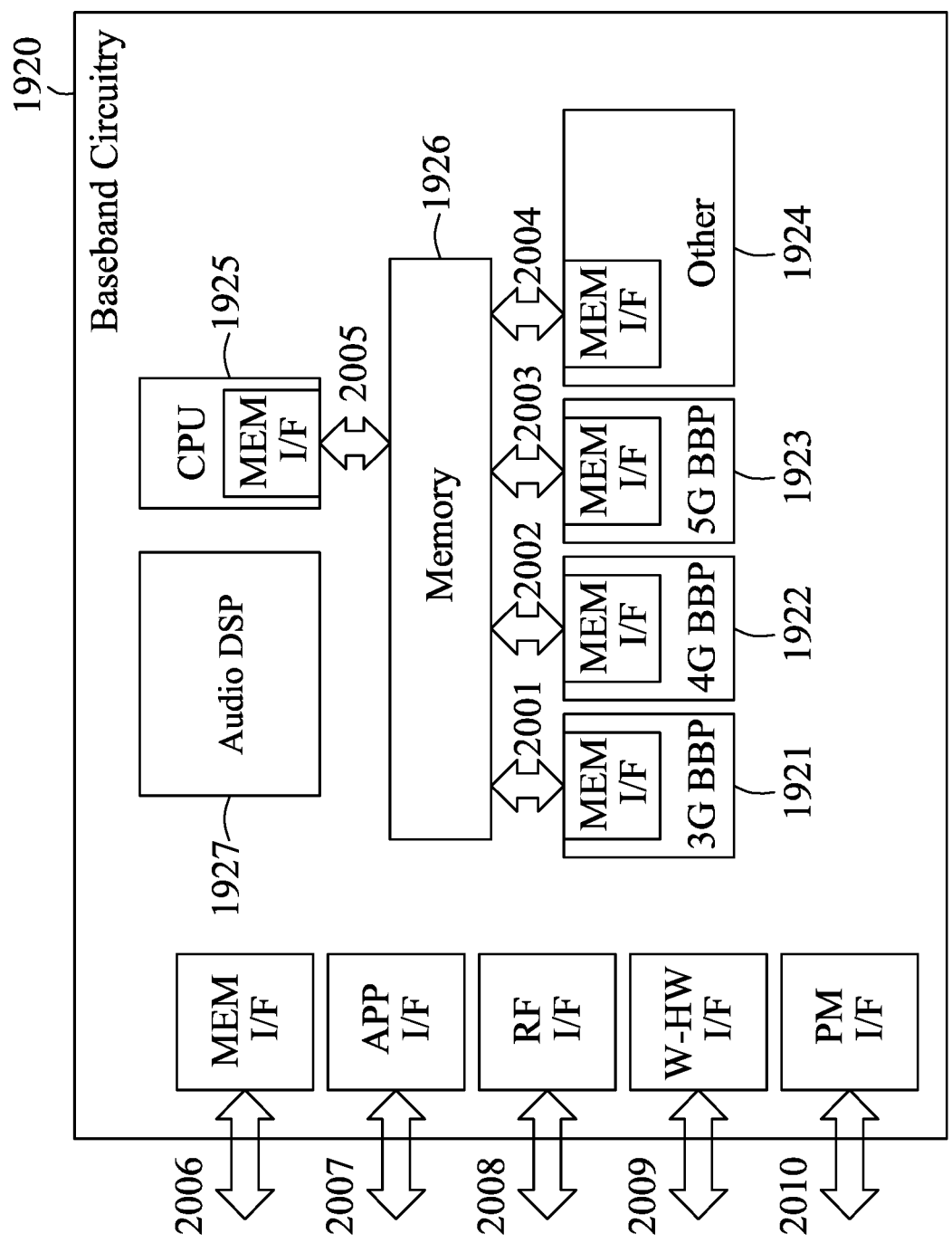
FIG. 20 illustrates example interfaces of baseband circuitry according to some embodiments of this disclosure.

FIG. 20 illustrates example interfaces of baseband circuitry in accordance with some embodiments. As discussed above, the baseband circuitry 1920 of FIG. 19 includes various processors (i.e., the baseband processors 1921-1924 and the CPU 1925), and the memory 1926 utilized by the processors. Each of the processors 1921-1925 may include an internal memory interface (MEM I/F) 2001-2005 communicatively coupled to the memory 1926 so as to send/receive data to/from the memory 1926.

The baseband circuitry 1920 may further include one or more interfaces to communicatively couple to other circuitries/devices. The one or more interfaces include, for example, a memory interface (MEM I/F) 2006 (e.g., an interface to send/receive data to/from memory external to the baseband circuitry 1920), an application circuitry interface (APP I/F) 2007 (e.g., an interface to send/receive data to/from the application circuitry 1910 of FIG. 19), an RF circuitry interface (RF I/F) 2008 (e.g., an interface to send/receive data to/from the RF circuitry 1930 of FIG. 19), a wireless hardware connectivity interface (W-HW I/F) 2009 (e.g., an interface to send/receive data to/from Near Field Communication (NFC) components, Bluetooth® components (e.g., Bluetooth® Low Energy), WiFi® components, and/or other communication components), and a power management interface (PM I/F) 2010 (e.g., an interface to send/receive power or control signals to/from the PMC 1960 of FIG. 19).

However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

EXAMPLES

The following examples pertain to specific technology embodiments and point out specific features, elements, or actions that can be used or otherwise combined in achieving such embodiments.

Example 1 is an apparatus includes memory and processing circuitry processing circuitry to cause a responding station (RSTA) to configure a location management report (LMR) frame to include an LMR in accordance with a previous measurement, encrypt the LMR frame using a protected management frames (PMF) scheme, and transmit the encrypted LMR frame to an initiating station (ISTA) for generating a long training field (LTF) sequence for a current measurement that is to be performed following the previous measurement.

Example 2 is the apparatus of Example 1, wherein the processing circuitry is to cause the RSTA to configure the LMR frame to include data that is to be used to generate a null data packet (NDP) for the current measurement. The processing circuitry is to cause the RSTA further to, in response to receiving a null data packet announcement (NDPA) and an input NDP for the current measurement from the ISTA, generate an output NDP for the current measurement based on the NDPA and the data using counter mode cipher block chaining message authentication code protocol (CCMP), and transmit the output NDP to the ISTA.

Example 3 is the apparatus of Example 2, wherein the processing circuitry is to cause the RSTA to configure the LMR frame to include an initialization vector that is to be used by the RSTA to generate the output NDP for the current measurement using CCMP.

Example 4 is the apparatus of Example 3, wherein the processing circuitry is to cause the RSTA further to randomly generate the initialization vector for the current measurement.

Example 5 is the apparatus of Example 2, wherein the processing circuitry is to cause the RSTA to configure the LMR frame to include a key that is to be used by the RSTA to generate the output NDP for the current measurement using CCMP.

Example 6 is the apparatus of Example 1, wherein the processing circuitry is to cause the RSTA to configure the LMR frame to include a measurement identifier associated with the current measurement.

Example 7 is the apparatus of Example 1, wherein the processing circuitry is to cause the RSTA, after transmitting the encrypted LMR frame to the ISTA, further to, in response to receiving from the ISTA a null data packet announcement (NDPA) with a measurement identifier of 0, configure a new LMR frame to include a measurement identifier associated with a next measurement that is to be performed following the current measurement without generating a null data packet (NDP) for the current measurement. The processing circuitry is to cause the RSTA further to encrypt the new LMR frame using the PMF scheme, and to transmit the encrypted new LMR frame to the ISTA.

Example 8 is the apparatus of Example 1, wherein the processing circuitry is to cause the RSTA further to generate a message integrity check (MIC) code based on a transient key that is used to encrypt the LMR frame, and to transmit the MIC code to the ISTA together with the encrypted LMR frame.

Example 9 is the apparatus of Example 1, wherein the processing circuitry is to cause the RSTA to configure the LMR frame to include a first measurement identifier associated with the current measurement. The processing circuitry is to cause the RSTA, after transmitting the encrypted LMR frame to the ISTA, further to, in response to receiving from the ISTA a null data packet announcement (NDPA) with a second measurement identifier that is not identical to the first measurement identifier included in the LMR frame, generate a predetermined null data packet (NDP), transmit the predetermined NDP to the ISTA, configure a new LMR frame to inform the ISTA to ignore previously received NDP and LMR frame, and transmit the new LMR frame to the ISTA.

Example 10 is the apparatus of Example 1, wherein the processing circuitry is to cause the RSTA to configure the LMR frame to include data that is to be used to generate a null data packet (NDP) for the current measurement. The processing circuitry is to cause the RSTA further to generate a trigger frame for the current measurement and to transmit the trigger frame to the ISTA. The processing circuitry is to cause the RSTA further to, in response to receiving an input NDP for the current measurement from the ISTA, to generate an output NDP for the current measurement based on the data using counter mode cipher block chaining message authentication code protocol (CCMP), and to transmit the output NDP to the ISTA.

Example 11 is the apparatus of Example 10, wherein the processing circuitry is to cause the RSTA, after transmitting the encrypted LMR frame to the ISTA, further to, in response to receiving from the ISTA a polling response with a first measurement identifier of 0, configure a new LMR frame to include a second measurement identifier associated with a next measurement that is to be performed following the current measurement without generating a null data packet (NDP) frame for the current measurement, encrypt the new LMR frame using PMF scheme, and transmit the encrypted new LMR frame to the ISTA.

Example 12 is an apparatus including memory and processing circuitry to cause a first ranging device to generate an initial group of sounding signal indications (SSIs) respectively for multiple measurements, and to transmit the initial group of SSIs to a second ranging device in a negotiation phase before the measurements.

Example 13 is the apparatus of Example 12, wherein, for each of the SSIs in the initial group, the processing circuitry is to cause the first ranging device to configure the SSI to indicate sounding signals for bidirectional sounding signal transmission between the first and second ranging devices for the respective one of the measurements.

Example 14 is the apparatus of Example 12, wherein, for each of the SSIs in the initial group, the processing circuitry is to cause the first ranging device to configure the SSI to indicate a sounding signal to be transmitted from one of the first and second ranging devices to the other one of the first and second ranging devices for the respective one of the measurements.

Example 15 is the apparatus of Example 14, wherein the processing circuitry is to cause the first ranging device further to transmit, to the second ranging device in the negotiation phase, a request for a group of SSIs respectively indicating sounding signals to be transmitted from said the other one of the first and second ranging devices to said one of the first and second ranging devices for the measurements, respectively.

Example 16 is the apparatus of Example 12, wherein the processing circuitry is to cause the first ranging device, before all SSIs in the initial group have been used to generate sounding signals, further to generate an additional group of SSIs respectively for a plurality of additional measurements, and to transmit the additional group of SSIs to the second ranging device before the additional measurements.

Example 17 is an apparatus including memory and processing circuitry to cause a first ranging device to generate a sounding signal indication (SSI) for a measurement and to transmit the SSI to a second ranging device in one of a polling phase and a trigger frame before the measurement.

Example 18 is the apparatus of Example 17, wherein the processing circuitry is to cause the first ranging device to configure the SSI to indicate sounding signals for bidirectional sounding signal transmission between the first and second ranging devices for the measurement.

Example 19 is the apparatus of Example 18, wherein the processing circuitry is to cause the first ranging device to transmit the SSI to the second ranging device in the polling phase, and to cause the first ranging device further to configure the trigger frame for allocating resource for transmission of an acknowledgement (ACK) from the second ranging device to the first ranging device and to transmit the trigger frame to the second ranging device.

Example 20 is the apparatus of Example 17, wherein the processing circuitry is to cause the first ranging device to configure the SSI to indicate a sounding signal to be transmitted from one of the first and second ranging devices to the other one of the first and second ranging devices for the measurement.

Example 21 is the apparatus of Example 20, wherein the processing circuitry is to cause the first ranging device further to transmit, to the second ranging device, a request for an SSI indicating a sounding signal to be transmitted from said the other one of the first and second ranging devices to said one of the first and second ranging devices for the measurement.

Example 22 is the apparatus of Example 21, wherein the processing circuitry is to cause the first ranging device further to transmit an acknowledgement (ACK) to the second ranging device in response to receiving the SSI from the second ranging device.

While the present techniques have been described with respect to a limited number of embodiments, those skilled in the art can appreciate numerous modifications and variations therefrom. It is intended that the appended claims cover all such modifications and variations as falling within the true spirit and scope of the present techniques.

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiments and other language does not necessarily refer to the same embodiment or the same example, but may refer to different and distinct embodiments, as well as potentially the same embodiment.

What is claimed is:

1. An apparatus comprising memory and processing circuitry to cause a responding station (RSTA) to:
    configure a location management report (LMR) frame to include an LMR in accordance with a previous measurement;
    encrypt the LMR frame using a protected management frames (PMF) scheme;
    configure the LMR frame to include data to be used to generate a null data packet (NDP) for the current measurement;
        transmit the encrypted LMR frame to an initiating station (ISTA) for generating a long training field (LTF) sequence for a current measurement that is to be performed following the previous measurement; and
    in response to receiving a null data packet announcement (NDPA) and an input NDP for the current measurement from the ISTA, generate an output NDP for the current measurement based on the NDPA and the data using counter mode cipher block chaining message authentication code protocol (CCMP); and
    transmit the output NDP to the ISTA.

2. The apparatus as claimed in claim 1, wherein the processing circuitry is to cause the RSTA to configure the LMR frame to include an initialization vector that is to be used by the RSTA to generate the output NDP for the current measurement using CCMP.

3. The apparatus as claimed in claim 2, wherein the processing circuitry is to cause the RSTA further to randomly generate the initialization vector for the current measurement.

4. The apparatus as claimed in claim 1, wherein the processing circuitry is to cause the RSTA to configure the LMR frame to include a key that is to be used by the RSTA to generate the output NDP for the current measurement using CCMP.

5. The apparatus as claimed in claim 1, wherein the processing circuitry is to cause the RSTA to configure the LMR frame to include a measurement identifier associated with the current measurement.

6. The apparatus as claimed in claim 1, wherein the processing circuitry is to cause the RSTA, after transmitting the encrypted LMR frame to the ISTA, further to:
    in response to receiving, from the ISTA, a null data packet announcement (NDPA) with a measurement identifier of 0, configure a new LMR frame to include a measurement identifier associated with a next measurement that is to be performed following the current measurement without generating a null data packet (NDP) for the current measurement;
    encrypt the new LMR frame using the PMF scheme; and
    transmit the encrypted new LMR frame to the ISTA.

7. The apparatus as claimed in claim 1, wherein the processing circuitry is to cause the RSTA further to generate a message integrity check (MIC) code based on a transient key that is used to encrypt the LMR frame, and to transmit the MIC code to the ISTA together with the encrypted LMR frame.

8. The apparatus as claimed in claim 1, wherein the processing circuitry is to cause the RSTA to configure the LMR frame to include a first measurement identifier associated with the current measurement, and to cause the RSTA, after transmitting the encrypted LMR frame to the ISTA, further to:
    in response to receiving, from the ISTA, a null data packet announcement (NDPA) with a second measurement identifier that is not identical to the first measurement identifier included in the LMR frame, generate a predetermined null data packet (NDP), transmit the predetermined NDP to the ISTA, configure a new LMR frame to inform the ISTA to ignore previously received NDP and LMR frame, and transmit the new LMR frame to the ISTA.

9. The apparatus as claimed in claim 1, wherein the processing circuitry is to cause the RSTA to configure the LMR frame to include data that is to be used to generate a null data packet (NDP) for the current measurement, and to cause the RSTA further to:
    generate a trigger frame for the current measurement;
    transmit the trigger frame to the ISTA;
    in response to receiving an input NDP for the current measurement from the ISTA, generate an output NDP for the current measurement based on the data using counter mode cipher block chaining message authentication code protocol (CCMP); and
    transmit the output NDP to the ISTA.

10. The apparatus as claimed in claim 9, wherein the processing circuitry is to cause the RSTA, after transmitting the encrypted LMR frame to the ISTA, further to:
    in response to receiving, from the ISTA, a polling response with a first measurement identifier of 0, configure a new LMR frame to include a second measurement identifier associated with a next measurement that is to be performed following the current measurement without generating a null data packet (NDP) frame for the current measurement;
encrypt the new LMR frame using PMF scheme; and
transmit the encrypted new LMR frame to the ISTA.

* * * * *